United States Patent
Sakamoto et al.

(10) Patent No.: US 7,735,388 B2
(45) Date of Patent: Jun. 15, 2010

(54) CONTROL SYSTEM AND METHOD FOR AUTOMATIC TRANSMISSION

(75) Inventors: Hiroshi Sakamoto, Hitachi (JP); Tatsuya Ochi, Tokai (JP); Yoshiyuki Yoshida, Hitachi (JP); Tetsuo Matsumura, Hitachinaka (JP); Kinya Fujimoto, Hitachinaka (JP); Masashi Seimiya, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 330 days.

(21) Appl. No.: 12/019,187

(22) Filed: Jan. 24, 2008

(65) Prior Publication Data

US 2008/0234105 A1   Sep. 25, 2008

(30) Foreign Application Priority Data

Mar. 19, 2007 (JP) .............................. 2007-069744

(51) Int. Cl.
*F16H 3/28* (2006.01)
(52) U.S. Cl. ....................................................... 74/339
(58) Field of Classification Search ....................... None
See application file for complete search history.

(56) References Cited

U.S. PATENT DOCUMENTS 6,070,117 A * 5/2000 Yamada et al. ................. 701/50
6,276,224 B1 * 8/2001 Ueda et al. ..................... 74/335
6,884,200 B2 * 4/2005 Shimaguchi ................ 477/124
6,997,075 B2 * 2/2006 Serebrennikov et al. ....... 74/339
7,222,552 B2 * 5/2007 Kouno et al. .............. 74/336 R

FOREIGN PATENT DOCUMENTS

JP   11-82710 A   3/1999

* cited by examiner

*Primary Examiner*—Dirk Wright
(74) *Attorney, Agent, or Firm*—Crowell & Moring, LLP

(57) ABSTRACT

A worsening of drivability is to be kept to a minimum by making a fail-safe control taking the state in the event of failure of a shifting operation into account. When clamping a sleeve to a free rotatable gear and during the period after instructing movement of the sleeve to a clamping position until movement of the sleeve to a predetermined positional range which makes it possible to judge that the sleeve has been clamped to the free rotatable gear, a pushing load for the sleeve is increased if the sleeve is in a fixed state near the balk ring, while if the sleeve is in a fixed state near the free rotatable gear, the sleeve is once returned to a neutral position thereof and is re-clamped to the free rotatable gear. Further, the number of times the sleeve is re-clamped to the free rotatable gear is counted and the use of the free rotatable gear is inhibited in accordance with the counted number of times.

21 Claims, 13 Drawing Sheets

CONTROL SYSTEM AND METHOD FOR AUTOMATIC TRANSMISSION

CLAIM OF PRIORITY

The present application claims priority from Japanese application Ser. No. 2007-69744, filed on Mar. 19, 2007, the content of which is hereby incorporated by reference into this application.

BACKGROUND OF THE INVENTION

1. Field of the Invention

The present invention relates to a control system and method for an automatic transmission. Particularly, the present invention resides in a control system and method for an automated MT (MT: Manual Transmission) which results from automating clutch/shift operations of a conventional manual transmission.

2. Description of Related Art

Manual transmissions popular in automobiles are small-sized, light-weight and highly efficient, in which a transmission is connected to an engine through a clutch. A system in which any of such transmissions and clutch are automated is generally called an automated MT (AMT: Automated Manual Transmission). This automated MT is expected as a next-generation transmission system capable of attaining both reduction of fuel consumption and easy drive.

In the above system, a shift operation for clamping a synchronizer sleeve to a free rotatable gear is automated and therefore a control method to be performed in the event of failure of the shift operation is important. In Japanese Patent Laid-Open Publication No. Hei 11 (1999)-082710 is described a method wherein, in case of a sleeve being unable to be clamped to an idle gear, a pushing load is once diminished and thereafter the sleeve is pushed against the idle gear with the previous load. According to this method, if the sleeve cannot be moved to a predetermined position, the pushing load is once diminished and the sleeve is moved again. Therefore, both sleeve and gear can be engaged with each other without increasing the load on a shift actuator mechanism and without re-starting the shift operation.

However, according to the control method described in the above laid-open publication, there is a fear that the operation for clamping the sleeve to the free rotatable gear may be delayed because the sleeve pushing load is once diminished. In the automatic transmission there is generally required a shift time of about 0.2 to 0.3 [s] and, for preventing a worsening of drivability, it is necessary to avoid a decrease of the pushing load as far as possible.

As shift operation failing cases there are a case where the sleeve is caught in a balk ring interposed between the sleeve and the free rotatable gear and a case where the sleeve is caught in a meshing part (hereinafter referred to as "gear dog") of the free rotatable gear. More particularly, as examples of the former case there are; (1) a case where the synchronizing power of the balk ring is deficient due to a lack of the pushing load for the sleeve or the influence of disturbance (e.g., clutch drag torque or a change in load of a transmission output shaft) and (2) a case where lubricating oil is not fed to between the balk ring and a cone face of the gear dog, resulting in sticking of the balk ring to the gear dog.

And as examples of the latter case there are;

(3) a case where there occurs differential revolution due to the influence of disturbance (e.g., clutch drag torque or a change in load of a transmission output shaft), making it impossible to clamp the sleeve to the free rotatable gear), and (4) a case where deterioration of the balk ring causes the sleeve to stroke to the free rotatable gear before the rotation is synchronized. For preventing the worsening of drivability as far as possible it is necessary to perform a re-clamping operation such as increasing the sleeve pushing load to effect quick clamping of the sleeve in the case of (1) or once diminishing the sleeve pushing load in the case of (2) to (3). Further, in the case of (4), it is necessary to replace the balk ring with another one. However, in order to minimize breakage of the transmission in the event of limp home, it is desirable to inhibit the use of the free rotatable gear immediately.

Thus, it is necessary to prevent a worsening of drivability in the event of failure of a shift operation, thereby ensure clamping of the sleeve, and for minimizing breakage of the transmission it is necessary to perform a control which is applicable to plural events.

SUMMARY OF THE INVENTION

According to the present invention, for solving the above-mentioned problems, there is provided a control system for an automatic transmission having an input shaft adapted to receive torque from a driving force source and rotate thereby, an output shaft for output of torque to a drive shaft of a vehicle, a plurality of gears adapted to rotate in synchronism with the input shaft and/or the output shaft, a plurality of free rotatable gears meshing with the gears, a plurality of sleeves adapted to rotate in synchronism with the input shaft and/or the output shaft and slidable axially, and a balk ring disposed between the free rotatable gears and the sleeves, wherein the balk ring is pushed against any of the free rotatable gears by movement of any of the sleeves, thereby synchronizing rotation of the sleeve with that of the free rotatable gear, and the sleeve and the free rotatable gear are brought into mesh with each other by further movement of the sleeve to attain a predetermined shift range, the control system comprising balk abutment determination means for determining whether the sleeve stays within a balk abutment range for a predetermined time or not and pushing load increasing means for increasing a pushing load on the sleeve when it is determined by the balk abutment determination means that the sleeve stays within the balk abutment range for the predetermined time.

According to the present invention it is possible to provide a control capable of preventing a worsening of drivability in the event of failure of a shift operation and ensuring clamping of a sleeve.

DETAILED DESCRIPTION OF THE PREFERRED EMBODIMENTS

An embodiment of the present invention will be described in detail hereinunder with reference to FIGS. 1 to 13.

Figure 1:
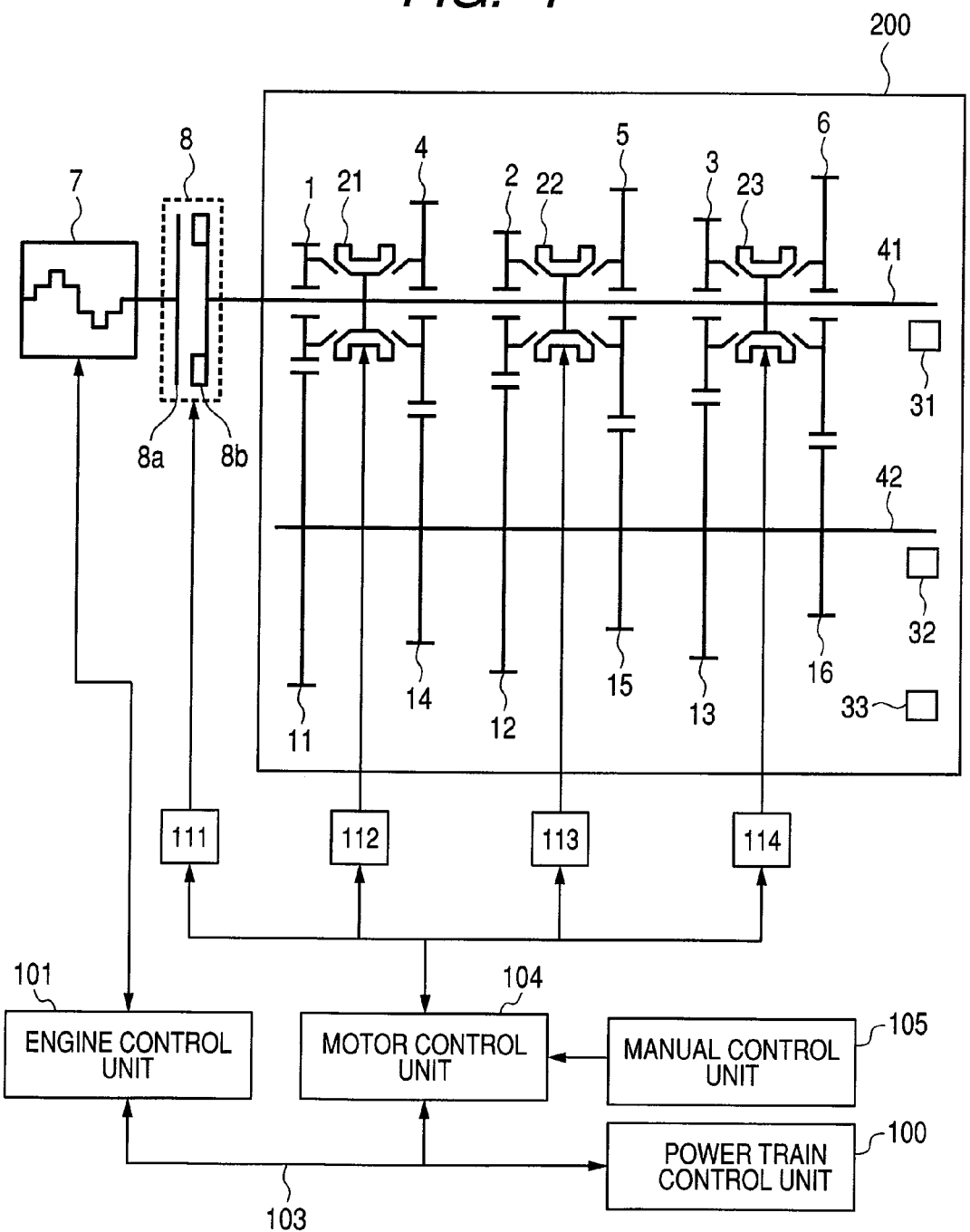
FIG. 1 is a configuration diagram of an automobile system according to an embodiment of the present invention.

FIG. 1 is a system configuration diagram showing an automobile control system according to an embodiment of the present invention.

There are provided an engine 7 as a driving force source, an engine speed sensor (not shown), an electronic controlled throttle (not shown) for adjusting engine torque, and a fuel injector (not shown) for injecting fuel in an amount matching the amount of intake air. The torque of the engine 7 can be controlled highly accurately by adjusting the amount of intake air, amount of fuel and ignition timing with use of an engine control unit 101. As the fuel injector there is known an intake port injection type wherein fuel is injected to an intake port or a direct injection type wherein fuel is injected directly into a cylinder. However, when a comparison is made with respect to a driving range (a range depending on engine torque and engine speed) required of the engine, it is considered advantageous to use an engine of the type which can decrease fuel consumption and which is superior in exhaust performance. The driving force source may be not only a gasoline engine but also a diesel engine, a natural gas engine, or an electric motor.

A clutch 8 and a transmission 200 is connected to the engine 7. The clutch 8 is composed of an input disc 8a and an output disc 8b. The transmission 200 is composed of an input shaft 41 connected to the clutch 8 and output shaft 42 connected to an driving system of the vehicle. By engaging and disengaging the input disc 8a and the output disc 8b it is possible to transmit or cut off the torque of the engine 7 to an input shaft 41 of the transmission 200. As the clutch 8 there generally is employed a dry type single plate clutch, provided there may be used all other clutches, including a wet type multiple disc clutch and an electromagnetic clutch. For controlling a pushing force (input shaft clutch torque) between the input disc 8a and the output disc 8b there is used an input shaft clutch actuator 111 adapted to operate using a motor. By adjusting the pushing force (input shaft clutch torque) it is possible to make and break the transmission of the output of the engine 7 to the input shaft 41.

A first driving gear 1, a second driving gear 2, a third driving gear 3, a fourth driving gear 4, a fifth driving gear 5 and a sixth driving gear 6, as free rotatable gears, are mounted on the input shaft 41. These free rotatable gears are mounted so as to be restrained their axial movement relative to the input shaft 41 but rotatable relative to the input shaft 41. As input shaft revolution detecting means there is provided an input shaft revolution sensor 31 for detecting the number of revolutions of the input shaft 41.

On the other hand, a first driven gear 11, a second driven gear 12, a third driven gear 13, a fourth driven gear 14, a fifth driven gear 15 and a sixth driven gear 16 are mounted on an output shaft 42 of the transmission. These driven gears are fixed to the output shaft 42. As output shaft revolution detecting means there is provided an output shaft revolution sensor 32 for detecting the number of revolutions of the output shaft 42. A oil temperature censor 33 is provided in the transmission 200 for sensing the temperature of the lubricant oil lubricating the components in the transmission 200. The output of the oil temperature censor 33 is send to the motor control unit 104 and used for controlling the drive of the specific gear shift range.

Although in this embodiment the free rotatable gears are mounted on the input shaft and fixed gears are provided on the output shaft, this arrangement may be modified such that the free rotatable gears are provided on the output shaft and the fixed gears provided on the input shaft. In this case, sleeves are mounted on the shaft on which the free rotatable gears are provided.

The first driving gear 1 and the first driven gear 11 are in mesh with each other and so are the second driving gear 2 and the second driven gear 12, the third driving gear 3 and the third driven gear 13, the fourth driving gear 4 and the fourth driven gear 14, the fifth driving gear 5 and the fifth driven gear 15, and the sixth driving gear 6 and the sixth driven gear 16.

A first synchromesh mechanism 21 for bringing the first driving gear 1 or the fourth driving gear 4 into engagement with the input shaft 41 is disposed between the first driving gear 1 and the fourth driving gear 4.

Rotational torque inputted to the input shaft 41 is transmitted via the first synchromesh mechanism 21 to the first driving gear 1, the first driven gear 11 and the output shaft 42 or to the fourth driving gear 4, the fourth driven gear 14 and the output shaft 42.

A second synchromesh mechanism 22 for bringing the second driving gear 2 or the fifth driving gear 5 into engagement with the input shaft 41 is disposed between the second driving gear 2 and the fifth driving gear 5. Therefore, rotational torque inputted to the input shaft 41 is transmitted via the second synchromesh mechanism 22 to the second driving gear 2, the second driven gear 12 and the output shaft 42 or to the fifth driving gear 5, the fifth driven gear 15 and the output shaft 42.

Further, a third synchromesh mechanism 23 for bringing the third driving gear 3 or the sixth driving gear 6 into engagement with the input shaft 41 is disposed between the third driving gear 3 and the sixth driving gear 6. Therefore, rotational torque inputted to the input shaft 41 is transmitted via the third synchromesh mechanism 23 to the third driving gear 3, the third driven gear 13 and the output shaft 42 or to the six driving gear, the sixth driven gear 16 and the output shaft 42.

Thus, for transmitting the rotational torque on the input shaft 41 to the output shaft 42, it is necessary any one of the first, second and third synchromesh mechanisms 21, 22, 23 be moved axially of the input shaft 41 and be brought into engagement with any one of the first, second, third, fourth, fifth and sixth driving gears 1, 2, 3, 4, 5, 6. A shift A actuator 112 is operated for moving the first synchromesh mechanism 21. Likewise, a shift B actuator 113 is operated for moving the second synchromesh mechanism 22 and a shift C actuator 114 is operated for moving the third synchromesh mechanism 23.

The rotational torque on the input shaft 41 thus transmitted from the first, second, third, fourth, fifth and sixth driving gears 1, 2, 3, 4, 5, 6 to the output shaft 42 via the first, second, third, fourth, fifth and sixth driven gears 11, 12, 13, 14, 15, 16 is then transmitted to an axle (not shown) via a differential gear (not shown) connected to the output shaft 42.

In connection with the input shaft clutch actuator which is for generating a pushing force (input shaft clutch torque) between the input disc 8a and the output disc 8b, an electric current of a motor (not shown) provided in the input shaft actuator 111 is controlled by a motor control unit 104, thereby controlling transfer torque of the clutch 8. The input shaft clutch actuator 111 is made up of the motor and a reduction mechanism or a mechanical part for converting the rotational motion of the motor into a linear motion. For example, it is constituted by a worm gear or a ball screw.

Although in this embodiment a motor actuator is used as the input shaft clutch actuator 11, there may be used an actuator operated hydraulically.

Further, pushing loads for operating the first, second and third synchromesh mechanisms 21, 22, 23, as well as the positions thereof, can be controlled by controlling the electric currents of motors (not shown) provided in the shift A actuator 112, shift B actuator 113 and shift C actuator 114 with use of the motor control unit 104. The shift A actuator 112, shift B actuator 113 and shift C actuator 114 are each constituted by a motor and a reduction mechanism or a mechanical part for converting the rotational motion of the motor into a linear motion. For example, it is constituted by a gear and an arm, or a ball screw.

By controlling the shift A actuator 112 to control the first synchromesh mechanism 21, the first synchromesh mechanism 21 and the first driving gear 1 come into mesh with each other, providing a first shift range.

By controlling the shift A actuator 112 to control the first synchromesh mechanism 21, the first synchromesh mechanism 21 and the fourth driving gear 4 come into mesh with each other, providing a fourth shift range.

By controlling the shift B actuator 113 to control the second synchromesh mechanism 22, the second synchromesh mechanism 22 and the second driving gear 2 come into mesh with each other, providing a second shift range.

By controlling the shift B actuator 113 to control the second synchromesh mechanism 22, the second synchromesh mechanism 22 and the fifth driving gear 5 come into mesh with each other, providing a fifth shift range.

By controlling the shift C actuator to control the third synchromesh mechanism 23, the third synchromesh mechanism 23 and the third driving gear 3 come into mesh with each other, providing a third shift range.

By controlling the shift C actuator 114 to control the third synchromesh mechanism 23, the third synchromesh mechanism 23 and the sixth driving gear 6 come into mesh with each other, providing a sixth shift range.

Although in this embodiment motor actuators are used as the shift A actuator 112, shift B actuator 113 and shift C actuator 114, there may be used actuators operated hydraulically. A manual control unit 105 is provided in the system as an switching means for the manual operation of a driver. The output of the manual control unit 105 is send to the motor control unit 104. By a single switch operation, the manual control unit 105 can skip over the shift range of the inhibited gear.

The torque of the engine 7 is controlled with high accuracy by controlling the amount of intake air, the amount of fuel and ignition timing with use of the engine control unit 101.

The motor control unit 104, the manual control unit 105 and the engine control unit 101 are controlled by a power train control unit 100. The power train control unit 100, engine control unit 101, the manual control unit 105 and motor control unit 104 transmit and receive information to and from one another through communication means 103.

Figure 2:
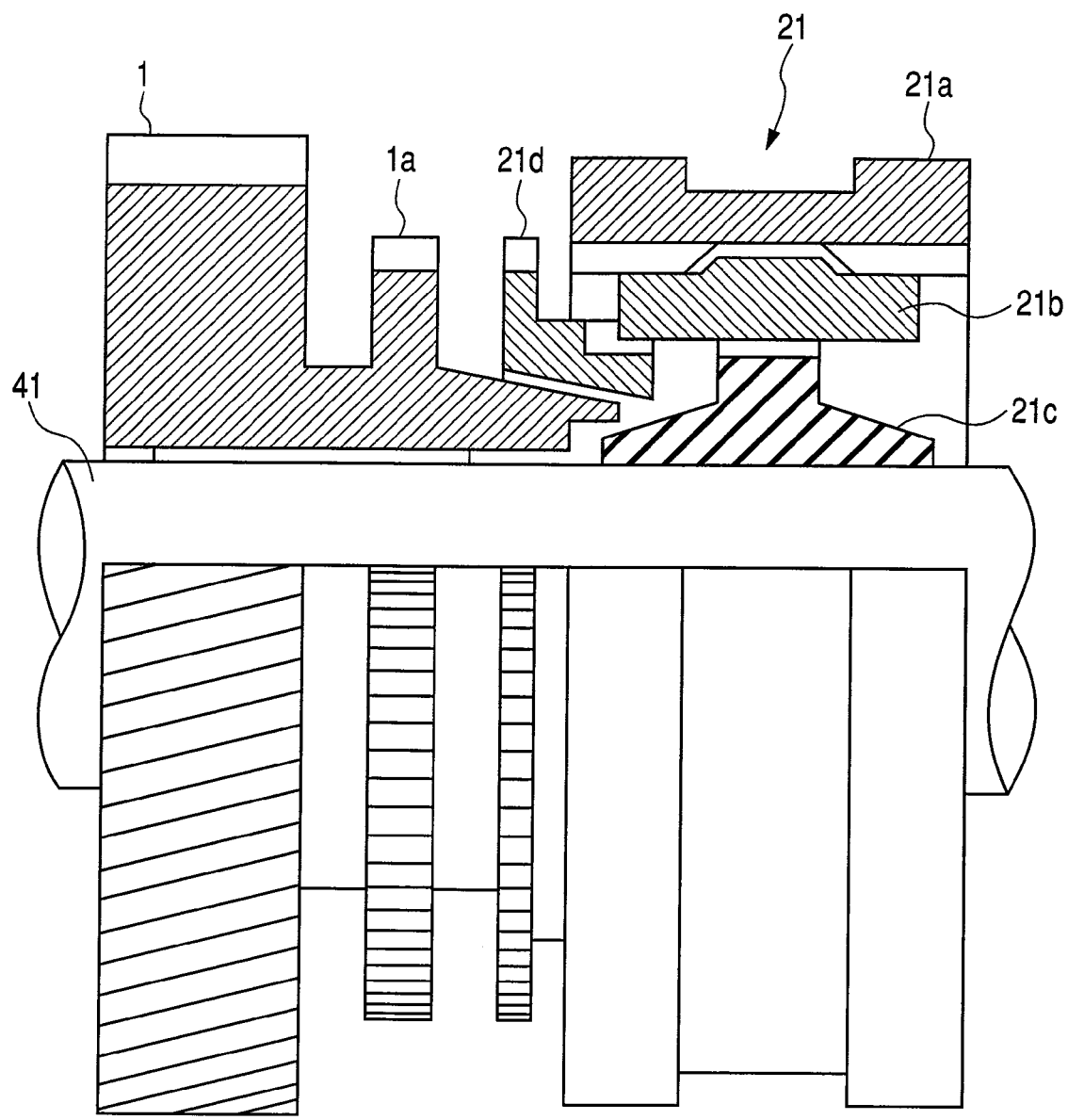
FIG. 2 is a partially cutout cross sectional view of a synchromesh.

FIG. 2 is a partially cutout cross sectional view showing the construction of a synchromesh mechanism. More specifically, FIG. 2 is an extracted and enlarged sectional view of the portions of the first synchromesh mechanism 21, input shaft 41 and first driving gear 1 which are shown in FIG. 1.

In the synchromesh mechanism 21 shown in FIG. 2, a sleeve 21a is splined to a hub 21c which rotates together with the input shaft 41. When a pushing load is applied to the sleeve 21a, a key 21b moves together with the sleeve 21a and an end face thereof pushes a balk ring 21d against a cone portion of the first driving gear 1 which is a free rotatable gear. At this time, friction occurs on a cone surface between the balk ring 21d and the first driving gear 1 to effect the transfer of torque, so that the rotation of the first driving gear 1 gradually approaches the rotation of the sleeve 21a.

When the sleeve 21a further moves and becomes disengaged from the balk ring 21b, the sleeve 21a pushes the balk ring 21d directly. As a result, friction is exerted on the cone surface between the balk ring 21d and the first driving gear 1 to effect the transfer of torque, so that the rotation of the first driving gear 1 becomes coincident with the rotation of the sleeve 21a. That is, both rotations are synchronized with each other.

Consequently, the balk ring 21d becomes rotatable and no longer obstructs the movement of the sleeve 21a. As a result, the sleeve 21a passes the balk ring 21d and comes into complete mesh with a gear dog 1a of the first driving gear 1. Shift is now completed.

Although in this embodiment there is used a single cone type including one cone surface of the synchromesh mechanism, there also may be used a double cone type including two cone surfaces or a triple cone type including three cone surfaces. It is advantageous to adopt a cone type of a large capacity having plural cone surfaces so as to permit the transfer of large torque at a low pushing load. Moreover, although the synchromesh mechanisms used in this embodiment are an inertial lock key type, there also may be used any of various other types, including a pin type and a servo type.

Figure 3:
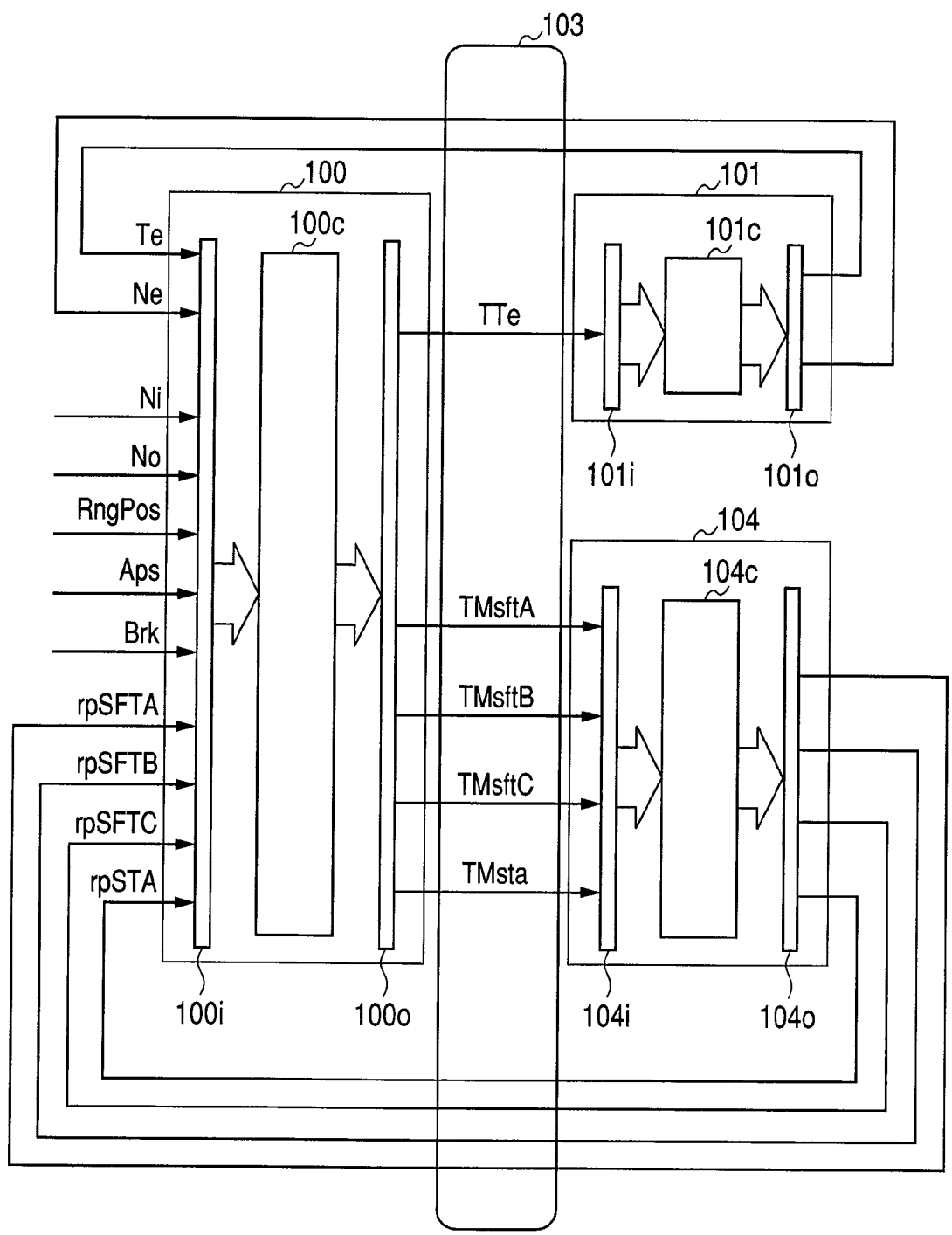
FIG. 3 is a block diagram showing an input/output signal relation among a power train control unit 100, an engine control unit 101 and a motor control unit 104.

In FIG. 3 there is shown an input/output signal relation among the power train control unit 100, engine control unit 101 and motor control unit 104. The power train control unit 100 is constituted as a control unit having an input portion 100i, an output portion 100o and a computer 100c. Likewise, the engine control unit 101 is constituted as a control unit having an input portion 101i, an output portion 101o and a computer 101c. The motor control unit 104 is also constituted as a control unit having an input portion 104i, an output portion 104o and a computer 104c. Using the communication means 103, an engine torque command value TTe is transmitted from the power train control unit 100 to the engine control unit 101, which in turn controls the amount of intake air, the amount of fuel and ignition timing for the engine 7.

Within the engine control unit 101 is provided detection means (not shown) for detecting engine torque as input torque to the transmission. The number of revolutions Ne of the engine 7 and engine torque T4 generated by the engine 7 are detected by the engine control unit 101 and are transmitted to the power train control unit 100 through the communication means 103. As the engine torque detecting means there may be used a torque sensor or estimation means using engine parameters such as, for example, the injection pulse width of an injector, internal pressure of an intake pipe and engine speed.

Shift A motor target torque TMsftA, shift B motor target torque TMsftB, shift C motor target torque TMsftC, and input shaft clutch motor target torque TMsta, are transmitted from the power train control unit 100 to the motor control unit 104, which in turn controls the motor current in the shift A actuator 112 so as to attain the shift A motor target torque TMsftA and performs pushing, engagement and release of the first synchromesh mechanism 21. Likewise, the motor control unit 104 controls the motor currents in the shift B actuator 113 and the shift C actuator 114 so as to attain the shift B motor target torque TMsftB and the shift C motor target torque TMsftC and performs pushing, engagement and release of the second and third synchromesh mechanisms 22, 23. Moreover, the motor control unit 104 controls the motor current in the input shaft clutch actuator 111 and performs engagement and release of the input disc 8a and the output disc 8b of the clutch 8 to attain the clutch motor target torque TMsta.

Further, the motor control unit 104 detects a shift A position signal rpSFTA indicating the stroke of the first synchromesh mechanism 21, a shift B position signal rpSFTB indicating the stroke of the second synchromesh mechanism 22, a shift C position signal rpSFTC indicating the stroke of the third synchromesh mechanism 23, and a position signal rpSTA indicting the stroke of the input shaft clutch 8, and transmits the detected signals to the power train control unit 100.

Input shaft revolutions Ni and output shaft revolutions No are inputted to the power train control unit 100 from the input shaft revolution sensor 31 and the output shaft revolution sensor 32, respectively. Further, a range position signal Rng-Pos indicating a shift lever position such as P range, R range, N range, or D range, an accelerator pedal depression quantity Aps, and an ON/OFF signal Brk provided from a brake switch which signal detects whether the brake is depressed or not, are inputted to the power train control unit 100.

For example, when the driver sets the shift range to D range and depresses the accelerator pedal, the power train control unit 100 judges that the driver has the intention of starting and acceleration, while when the driver depresses the brake pedal, the power train control unit 100 judges that the driver has the intention of deceleration and stop. Then, in such a manner as to realize the driver's intention, the power train control unit 100 sets the engine torque command value TTe, shift A motor target torque TMsftA, shift B motor target torque TMsftB, shift C motor target torque TMsftC, and input shaft clutch motor target torque TMsta. Moreover, the power train control unit 100 sets a target shift range on the basis of vehicle speed Vsp calculated from the output shaft revolutions No and the accelerator pedal depression quantity Aps. Then, for execution of a shift operation to the set shift range, the power train control unit 100 sets the engine torque command value TTe, shift A motor target torque TMsftA, shift B motor target torque TMsftB, shift C motor target torque TMsftC, and input shaft clutch motor target torque TMsta.

(Basic Structure of the Embodiment)

Next, the automobile control system and method according to this embodiment will be described in detail with reference to FIGS. 4 to 13.

Figure 4:
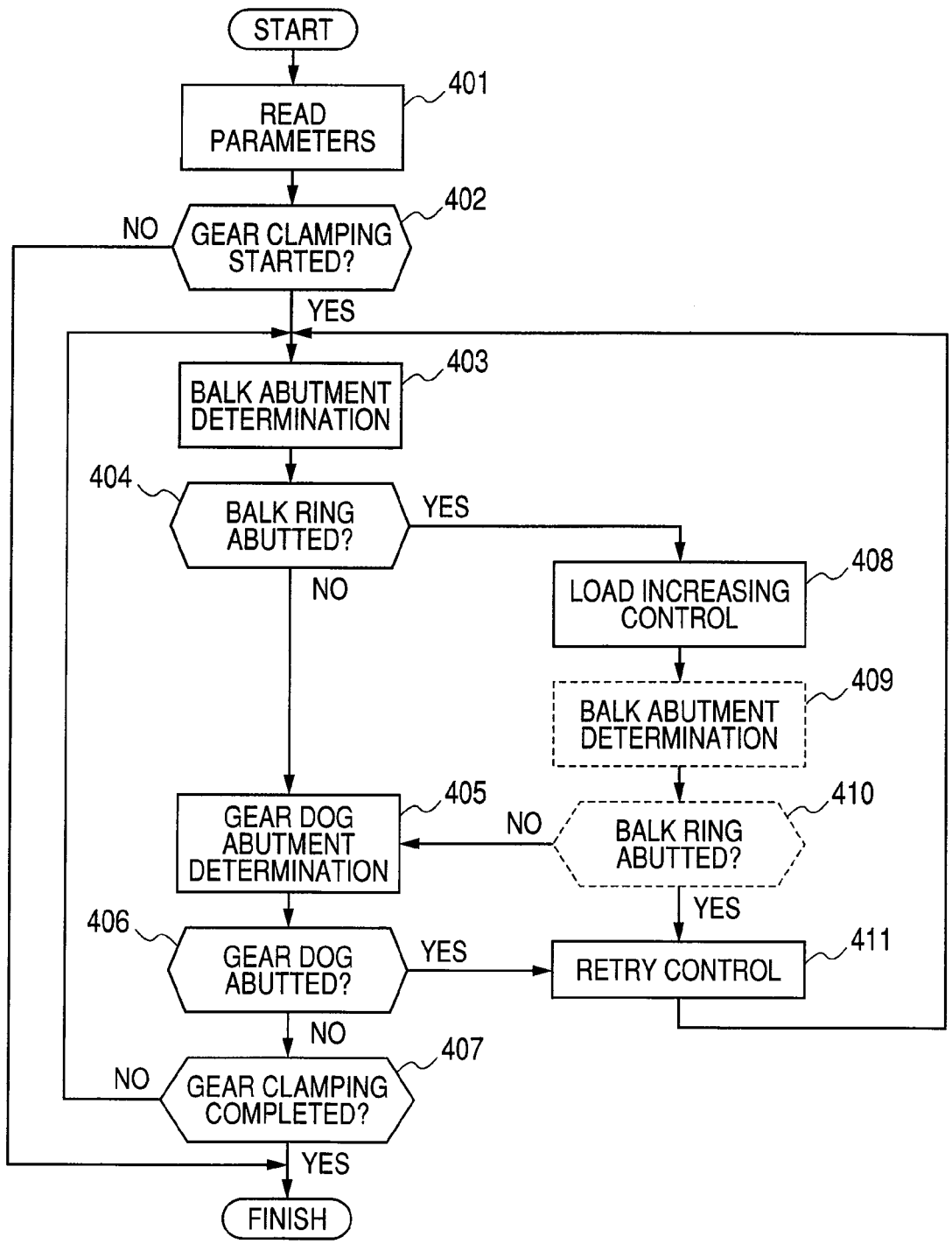
FIG. 4 is a flow chart showing processing contents of an automatic transmission control system according to the embodiment.

FIG. 4 is a flow chart showing the contents of control performed by the automatic transmission control system according to the present invention.

The following control contents are programmed in the computer 100c of the power train control unit 100 and are executed repeatedly with a predetermined cycle. The processing of the following steps 401 to 411 are executed by the power train control unit 100.

First, in step 401, parameters are read, then in step 402, any one of the first, second and third synchromesh mechanisms 21, 22, 23 is selected in accordance with a target shift range and a check is made to see if a control of clamping the sleeve of the selected synchromesh mechanism to a free rotatable gear has been started or not. If the clamping control has been started, the processing flow advances to step 403 (balk abutment determining means), while if the clamping control has not been started, the processing is ended. Next, in step 403, it is determined whether the sleeve in operation is a fixed state or not near the balk ring, then the processing flow advances to step 404. The determination in step 403 is made on the basis of whether the state in which the stroke position signal of the selected synchromesh mechanism out of shift A position signal rpSFTA, shift B position signal rpSFTB and shift C position signal rpSFTC as stroke position signals of the first, second and third synchromesh mechanisms 21, 22, 23 lies within a predetermined range near the balk ring has continued or not for a predetermined time. If in step 404 it is determined that the sleeve in operation is in a fixed state or not near the balk ring, the processing flow advances to step 408 (load increasing control), in which a pushing load increasing control for the sleeve is performed. Then, the processing flow advances to step S409 (balk abutment determining means), in which, as in step 403, a check is made to see if the sleeve in operation is in a fixed state or not near the balk ring, followed by advance to step S410. If it is determined in step S410 that the sleeve in operation is in a fixed state near the balk ring, the processing flow advances to step 411 (retry control means), in which there is performed a control of one returning the sleeve to its neutral position and reclamping it to a free rotatable gear. If it is determined in step 410 that the sleeve in operation is not in a fixed state near the balk ring, the processing flow advances to step 405 (gear dog abutment determination means).

On the other hand, if it is determined in step 404 that the sleeve in operation is not in a fixed state near the balk ring, the processing flow advances to step 405 (gear dog abutment determination). In step 405, a check is made to see if the sleeve in operation is in a fixed state or not near the gear dog of the free rotatable gear, followed by advance to step 406. The determination in step 405 is made on the basis of whether the state in which the stroke position signal of the selected synchromesh mechanism out of shift A position signal rpSFTA, shift B position signal rpSFTB and shift C position signal rpSFTC as stroke position signals of the first, second and third synchromesh mechanisms 21, 22, 23 lies within a predetermined range near the gear dog of the free rotatable gear has continued or not for a predetermined time. If it is determined in step 406 that the sleeve in operation is in a fixed state near the gear dog of the free rotatable gear, the processing flow advances to step 411 (retry control), in which there is performed a control of once returning the sleeve to its neutral position and reclamping it to the free rotatable gear. If it is determined in step 406 that the sleeve in operation is not in a fixed state near the gear dog of the free rotatable gear, the processing flow advances to step 407, in which it is determined whether the clamping of the sleeve in operation to the free rotatable gear has been completed or not in accordance with the stroke position signal of the selected synchromesh mechanism. If it is determined in step 407 that the clamping of the sleeve to the free rotatable gear has not been completed yet, the processing flow shifts to step 403, while if it is determined that the clamping of the sleeve to the free rotatable gear has been completed, the processing is ended.

Next, with reference to FIGS. 5 to 8, a detailed description will be given below about processing contents of the balk abutment determination means, gear dog abutment determination means, pushing load increasing means and retry control means in the automatic transmission system according to the present invention.

(Balk Abutment Determination)

Figure 5:
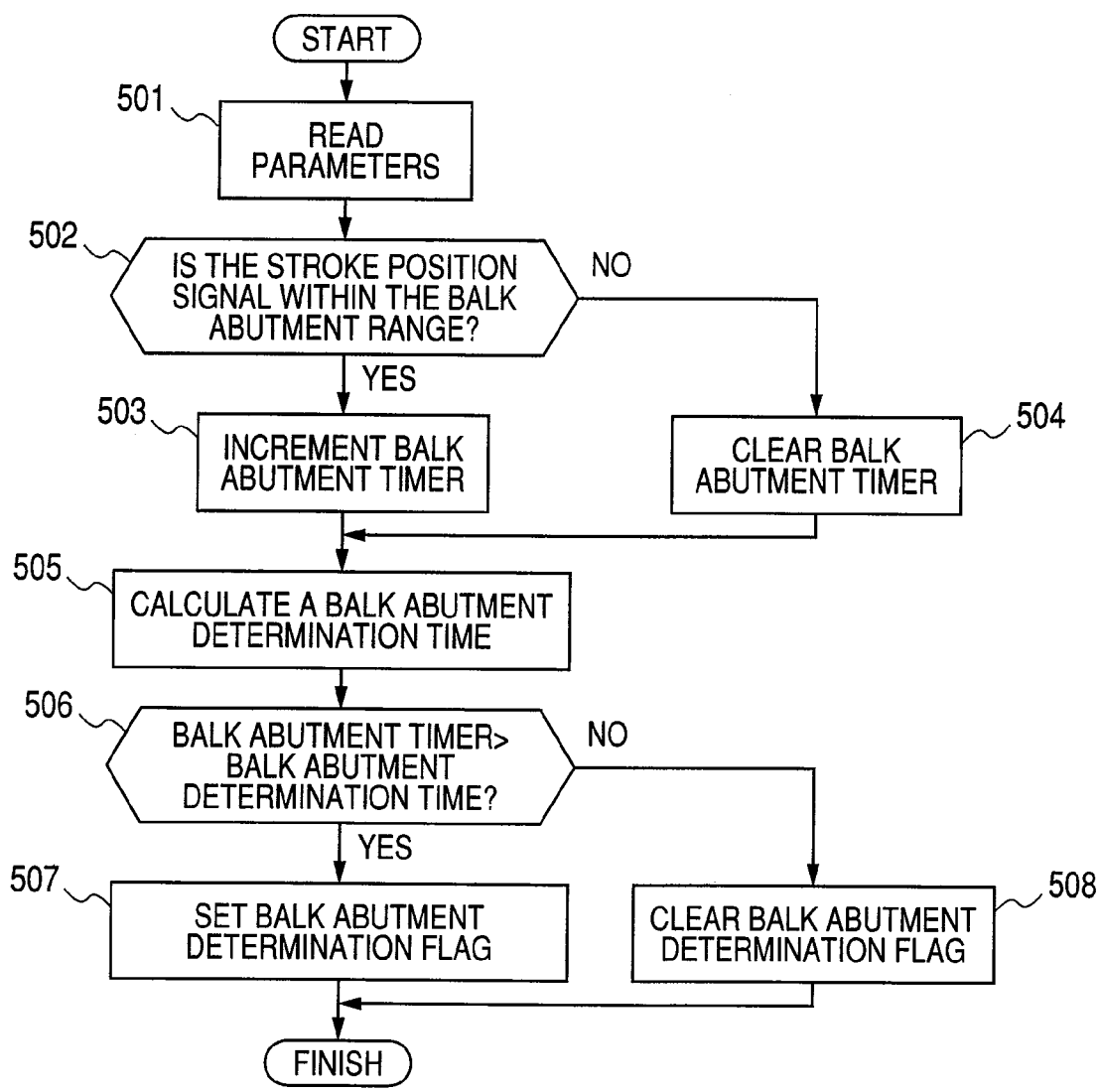
FIG. 5 is a flow chart showing processing contents of balk abutment determining means according to the embodiment.

FIG. 5 is a flow chart showing processing contents of steps 403 and 409 (balk abutment determination) in FIG. 4.

First, in step 501, parameters are read, then in step 502 it is determined whether a stroke position signal lies within a balk abutment range or not. The balk abutment range indicates a range from where the moving sleeve 21*a* comes into abutment against the balk ring 21*d* up to where the further moving sleeve 21*a* has got over the balk ring 21*d*. If it is determined that the stroke position signal lies within the balk abutment range, the processing flow advances to step 503, in which there is performed a balk abutment timer increment processing. On the other hand, if it is determined that the stroke position signal does not lie within the balk abutment range, the processing flow shifts to step 504, in which there is performed a balk abutment time clear processing.

Next, in step 505, a balk abutment determination time is calculated for determining whether the sleeve in operation is fixed to the balk ring or not, followed by advance to step 506. Since the state of each synchromesh mechanism changes depending on the number of times of repetition of the retry control, the transmission oil temperature and shift range, it is preferable that the balk abutment determination time be adjusted according to the number of times of the retry control, the transmission oil temperature and shift range. Then, in step 506, it is determined whether the time set in the balk abutment timer is longer than the balk abutment determination time or not. If it is determined in step 506 that the time set in the balk abutment timer is longer than the balk abutment determination time, the processing flow advances to step 507, in which Balk Abutment Determination Flag is set and the processing is ended. On the other hand, if it is determined in step 506 that the time set in the balk abutment timer is shorter than the balk abutment determination time, the processing flow shifts to step 508, in which Balk Abutment Determination Flag is cleared and the processing is ended.

(Gear Dog Abutment Determination)

Figure 6:
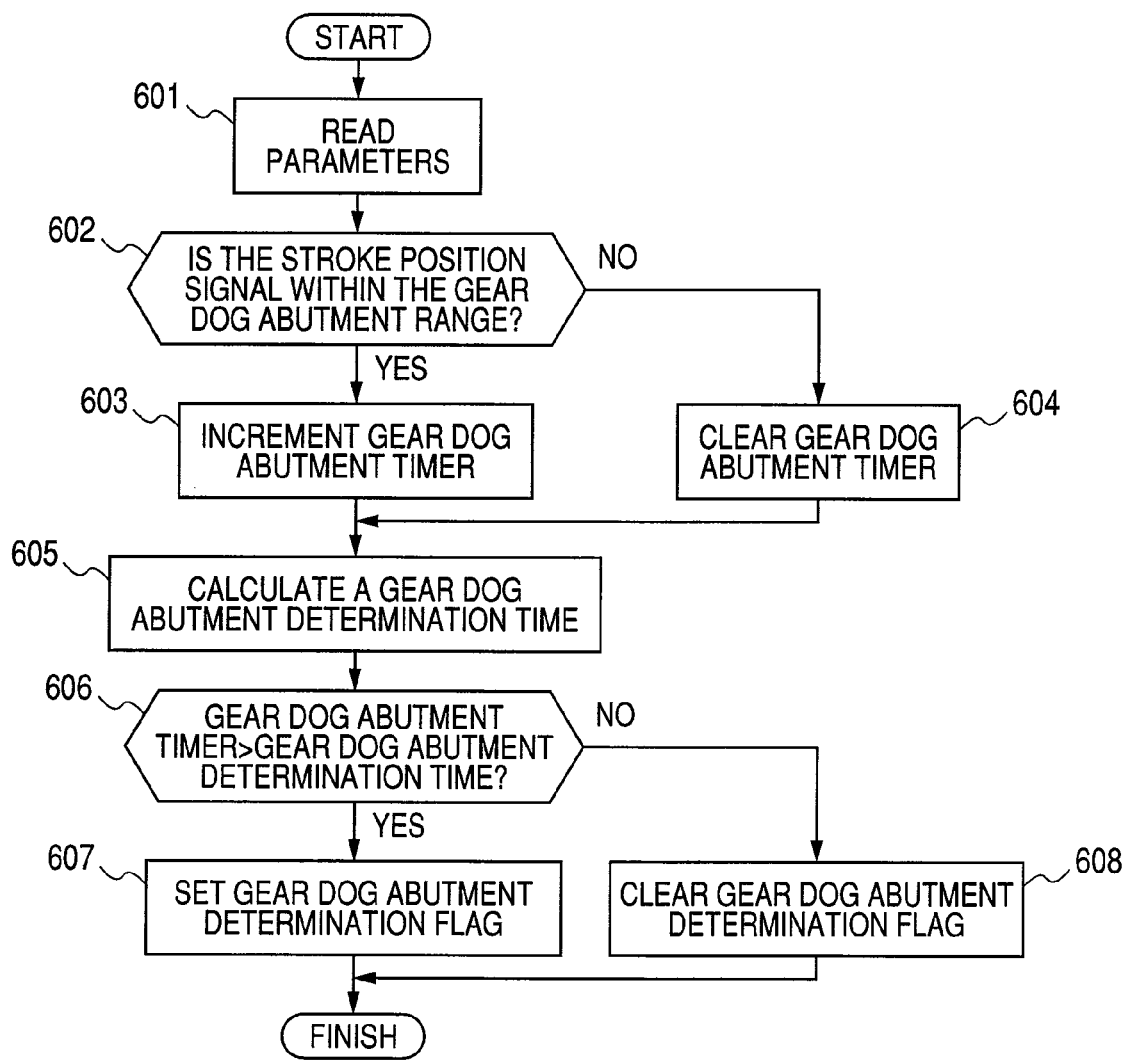
FIG. 6 is a flow chart showing processing contents of gear dog abutment determining means according to the embodiment.

FIG. 6 is a flow chart showing processing contents of step 405 (gear dog abutment determination) in FIG. 4.

First, in step 601, parameters are read, then in step 602 it is determined whether a stroke position signal lies within a gear dog abutment range or not. The gear dog abutment range indicates a range from contact of the sleeve 21*a* with the gear dog 1*a* until engagement of the sleeve 21*a* with the gear dog 1*a*. If it is determined that the stroke position signal lies within the gear dog abutment range, the processing flow advances to step 603, in which there is performed a gear dog abutment time increment processing. On the other hand, if it is determined that the stroke position signal does not lie within the gear dog abutment range, the processing flow shifts to step 604, in which there is performed a balk abutment timer clear processing.

Next, in step 605, a gear dog abutment determination time is calculated for determining whether the sleeve in operation is in a fixed state to the gear dog of a free rotatable gear, followed by advance to step 606. Since the state of each synchromesh mechanism changes depending on the number of times of repetition of the re-clamping control (retry control), the oil temperature and shift range, it is preferable that the gear dog abutment determination time be adjusted according to the number of times of the retry control, the oil temperature and shift range. Then, in step 606, it is determined whether the time set in the gear dog abutment timer is longer than the gear dog abutment determination time or not. If it is determined in step 606 that the time set in the gear dog abutment timer is longer than the gear dog abutment determination time, the processing flow advances to step 607, in which Gear Dog Abutment Determination Flag is set and the processing is ended. On other hand, if it is determined in step 606 that the time set in the gear dog abutment timer is shorter than the gear dog abutment determination time, the processing flow shifts to step 608, in which Gear Dog Abutment Determination Flag is cleared and the processing is ended.

(Increasing of Pushing Load)

Figure 7:
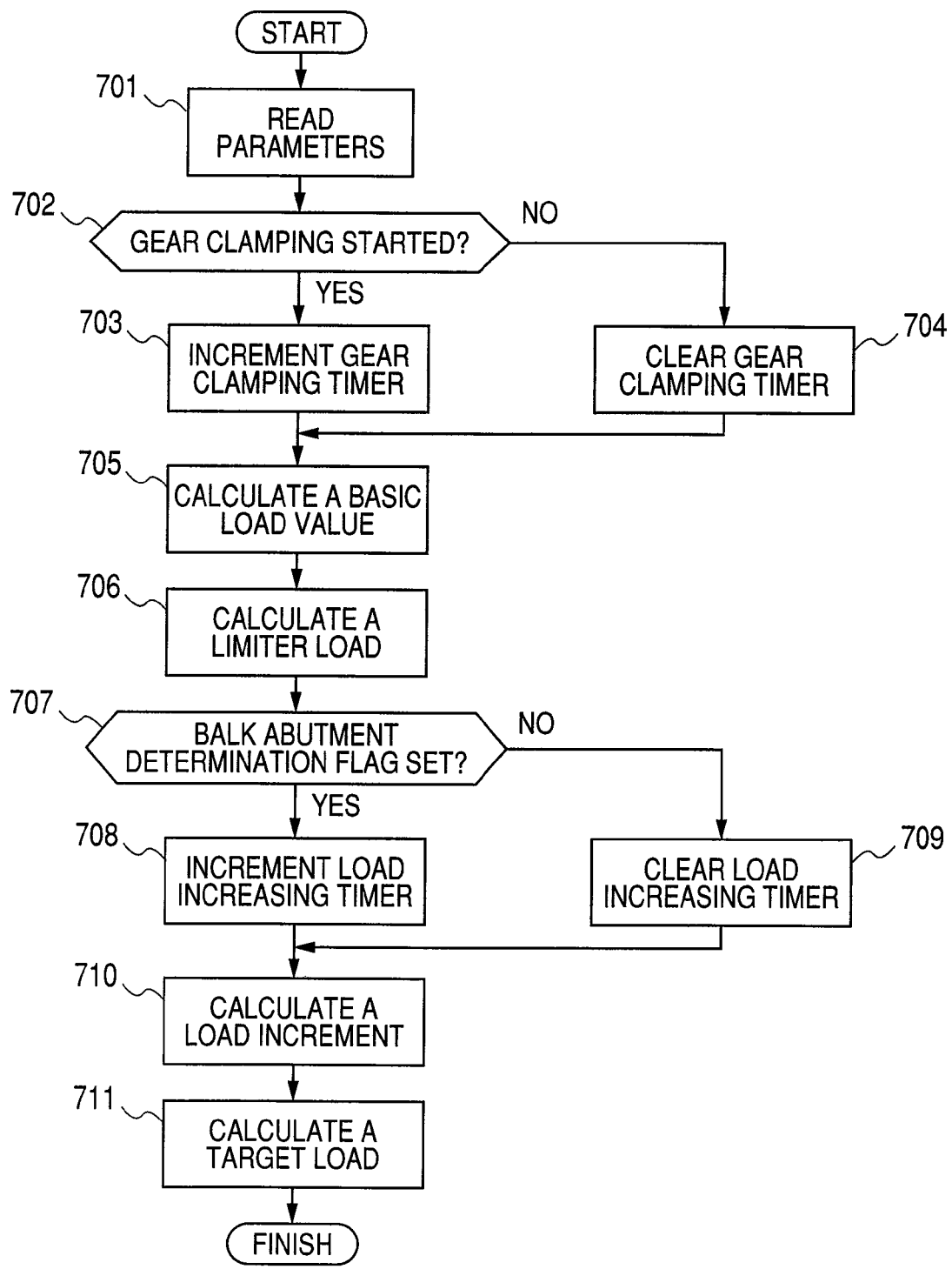
FIG. 7 is a flow chart showing the contents of a processing performed for clamping a sleeve to an idle gear, more particularly, processing contents of load increasing means according to the embodiment.

FIG. 7 is a flow chart showing the contents of processing performed for clamping a sleeve to a free rotatable gear. The processing of steps 707 to 711 in the same figure correspond to the processing of step 408 (load increasing means) in FIG. 4.

First, in step 701, parameters are read, then in step 702 there is selected any one of the first, second and third synchromesh mechanisms 21, 22, 23 in accordance with a target shift range and it is determined whether a control for clamping the sleeve of the selected synchromesh mechanism to a free rotatable gear has been started or not. If this control has been started, the processing flow advances to step 703, in which there is performed a gear clamping timer increment processing. On the other hand, if the control in question has not been started yet, the processing shifts to step 704, in which there is performed a gear clamping time clear processing. Next, in step 705, there is calculated a basic value of a sleeve pushing load which becomes necessary in the clamping control. The basic value of the pushing load is preferably set in accordance with the time set in a gear clamping timer which is calculated in steps 703 and 704 so as to cushion a collision shock against the balk ring in an initial stage of clamping.

Next, in step 706, there is calculated a limiter load which is a limit value of the sleeve pushing load in the clamping control, followed by advance to step 707. It is preferable that the limiter load be set in accordance with a stroke signal so as to cushion a collision shock at the time of clamping of the sleeve to the gear dog.

Next, in step 707 it is determined whether Balk Abutment Determination Flag is set or not. If the answer is affirmative, the processing flow advances to step 708, in which there is performed a load increase timer increment processing. On the other hand, if Balk Abutment Determination Flag is cleared, the processing flow advances to step 709, in which there is performed a load increase timer clear processing. Then, in step 710, an increment of the pushing load is calculated as a countermeasure to the case where the sleeve in operation is fixed to the balk ring due to a lack of synchronizing power. As to the increment of the pushing load, it is preferable that a gradual increase be made in accordance with the load increase timer in order to diminish the load on the actuator which would increase under an excessive increase of the pushing load. Lastly, in step 711, there is calculated an added value of both basic load value and load increment and there is selected either the added value or the limiter load whichever is the smaller, thereby calculating a target load for the sleeve.

(Retry Processing)

Figure 8:
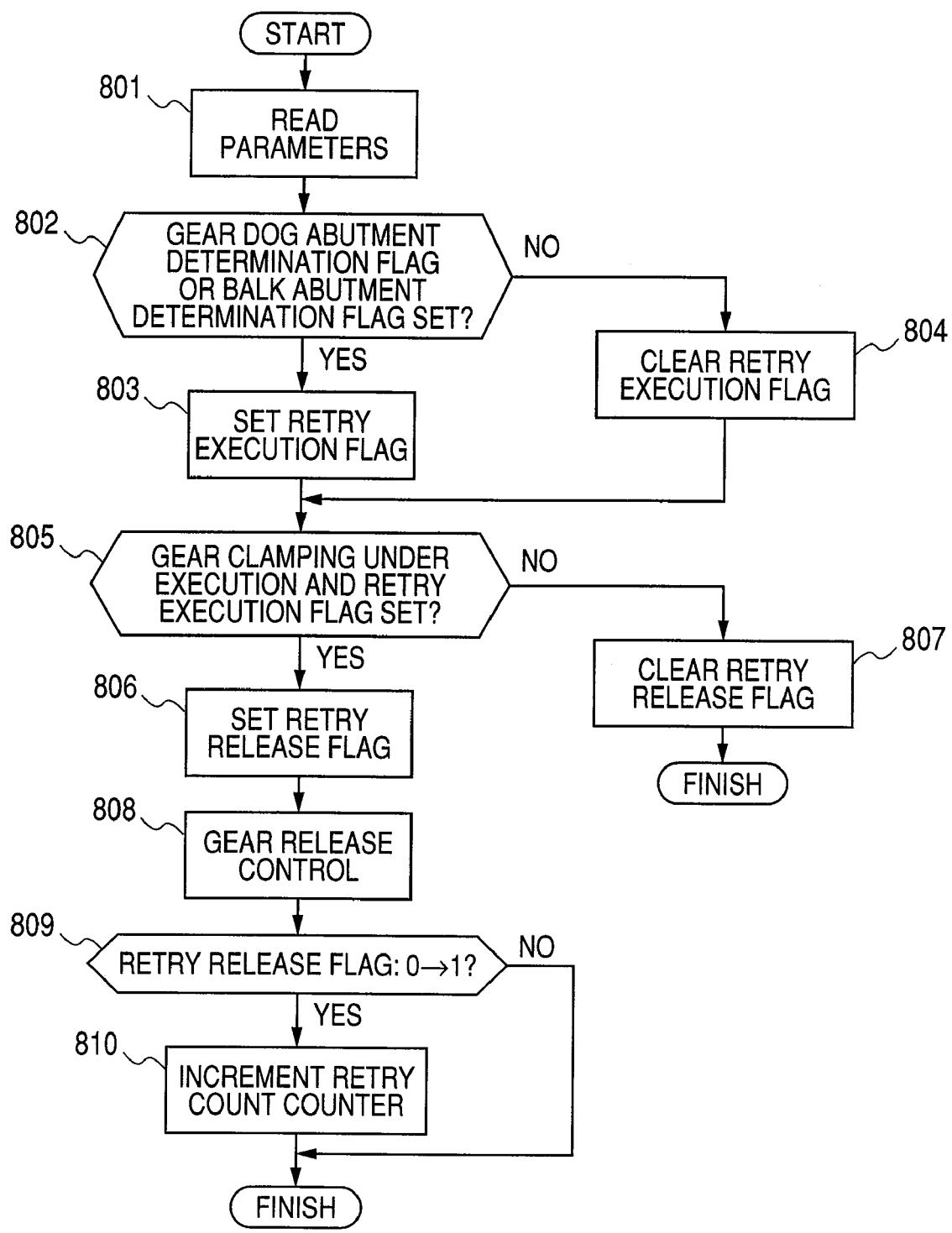
FIG. 8 is a flow chart showing processing contents of retry control means according to the embodiment.

FIG. 8 is a flow chart showing the contents of processing of step 411 (retry processing) in FIG. 4.

First, in step 801, parameters are read, then in step 802 it is determined whether Gear Dog Abutment Determination Flag is set or not or whether Balk Abutment Determination Flag is set or not after execution of the load increase control. If it is determined that either of the two flags is set, the processing flow advances to step 803, in which there is performed a processing for setting Retry Execution Flag. On the other hand, if it is determined that both flags referred to above are cleared, the processing flow advances to step 804, in which there is performed a processing for clearing Retry Execution Flag.

Next, in step 805, it is determined whether the control for clamping the sleeve of the selected synchromesh mechanism to the free rotatable gear is under execution or not and whether Retry Execution Flag is set or not. If it is determined that the said control is not under execution or that Retry Execution Flag is cleared, the processing flow advances to step S807, in which Retry Release Flag is cleared and the processing is ended. On the other hand, if it is determined that the control for clamping the sleeve to the free rotatable gear is under execution and that Retry Execution Flag is set, the processing flow advances to step 806, in which Retry Release Flag is set and the processing flow advances to step 808.

Next, in step 808, the sleeve clamping control for the free rotatable gear is stopped and there is executed a gear release control for once returning the sleeve in operation to its neutral position, followed by advance to step 809. In the gear release control it is necessary that the sleeve in operation be returned accurately up to its neutral position. Therefore, it is preferable that the stroke position signal be fed back to calculate the pushing load.

Next, with reference to steps 809 and 810 shown in FIG. 8, a description will be given about processing contents of retry count calculation means in the automobile control system according to the present invention. First, in step 809, it is determined whether Retry Release Flag has changed from Clear to Set state or not. If the answer is affirmative, the processing flow advances to step 810, in which there is performed an increment processing for a retry counter and the processing is ended. On the other hand, if it is determined that Retry Release Flag has not changed from Clear to Set state, the processing is ended without performing the retry counter increment processing. The retry counter clear processing may be done upon completion of the clamping of the sleeve in operation to the free rotatable gear or may be done upon start-up or end of the power train control unit so that there may remain the history of retry count within the driving cycle concerned (during the period from ON to OFF of the ignition switch). Further, in order to let the history of retry count remain from the time of shipping up to the present, there may be adopted a modification so as to store the history in a backup RAM (Random Access Memory) or EE-PROM (Electronically Erasable and Programmable Read Only Memory) mounted on the power train control unit 100 without performing the retry count clear processing. By thus counting the number of times the retry control was executed in the event of failure of a shift operation, the shift range concerned can be inhibited with use of specific gear shift range inhibiting means when the retry count exceeds a predetermined count, whereby it is possible to prevent damage of the transmission. Besides, by letting the history of retry count remain, a failed, or defective, part can be detected in a selling store or a repair shop.

(Action of the Sleeve and Free Rotatable Gears)

Figure 9:
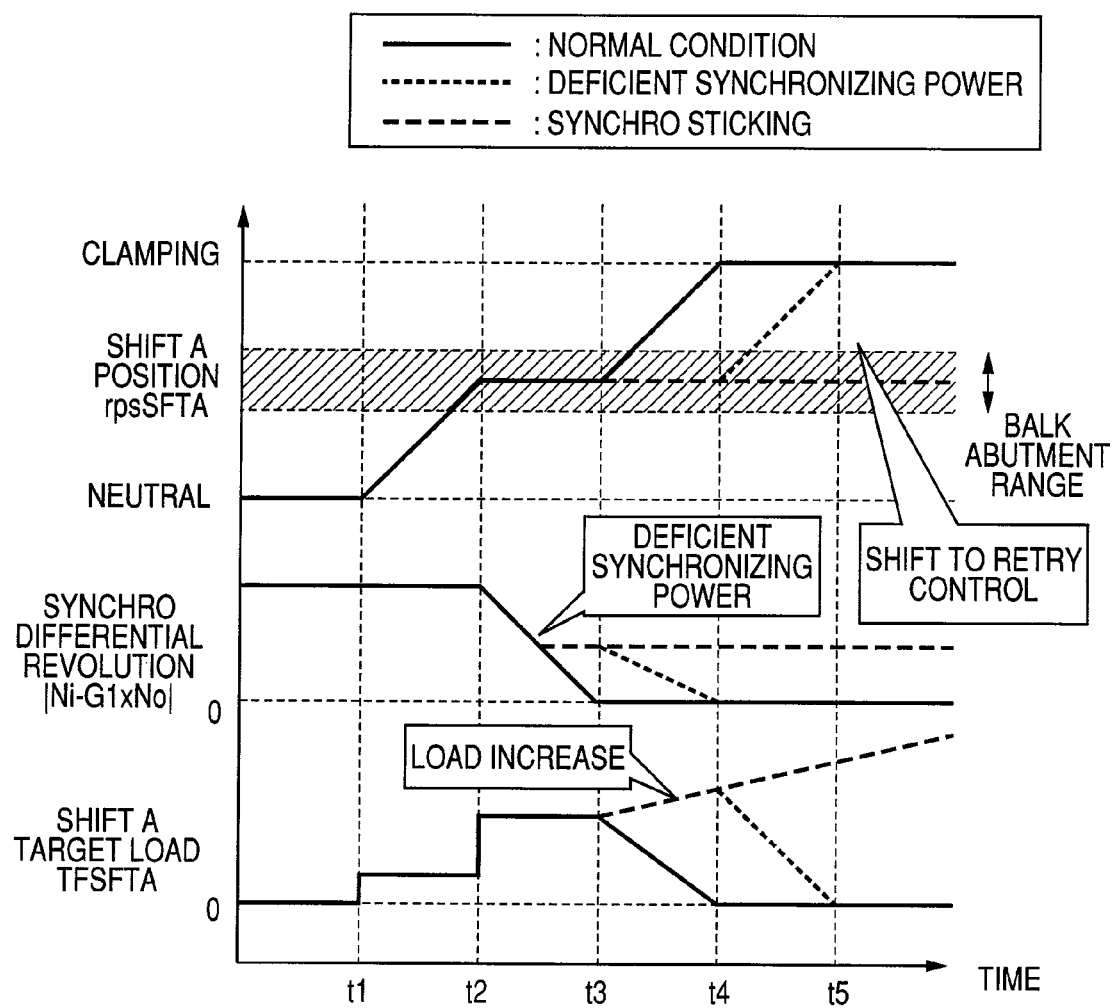
FIG. 9 is a time chart adopted in case of performing load increasing control in accordance with balk abutment determination.
Figure 10:
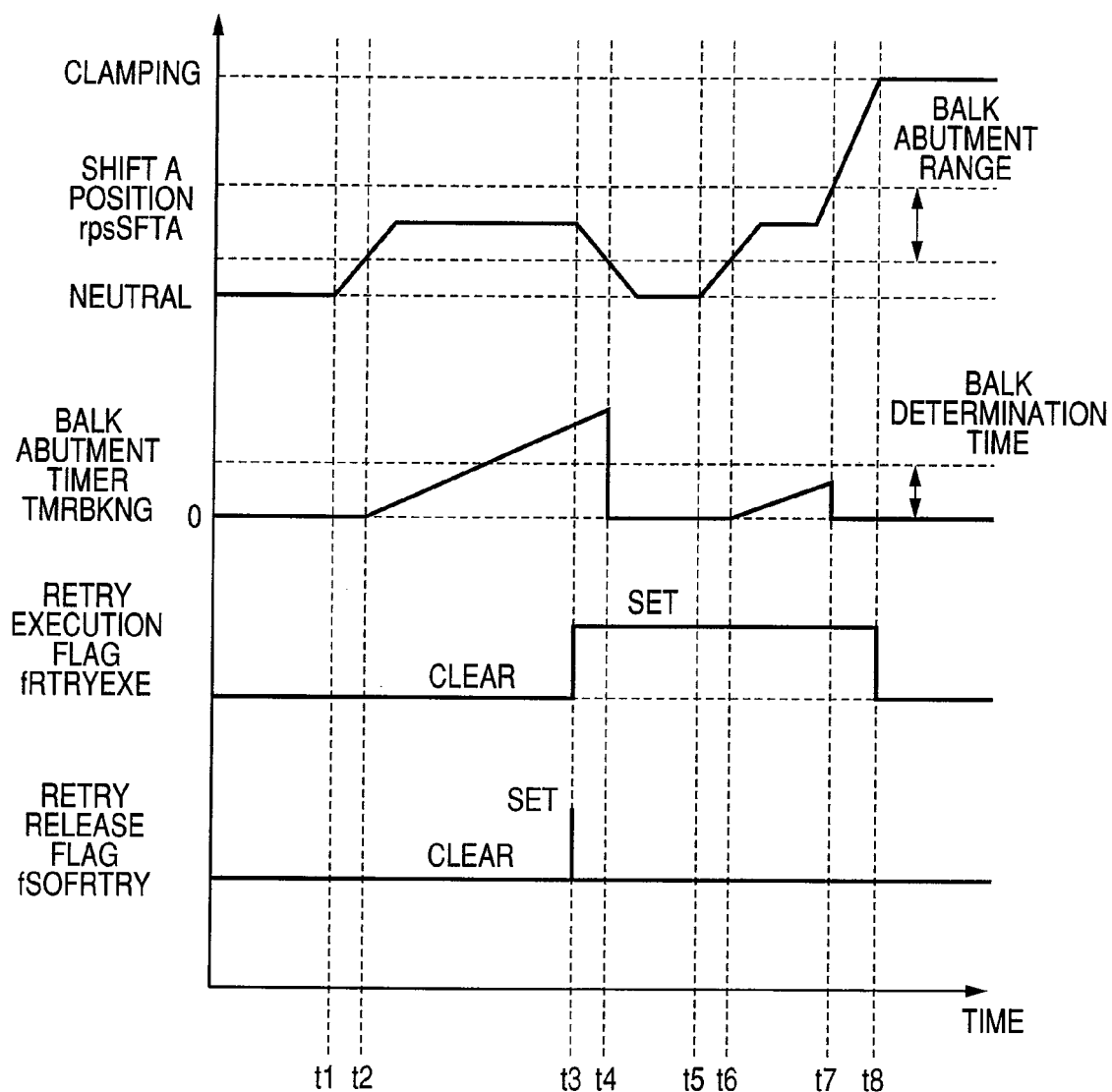
FIG. 10 is a time chart adopted in case of performing a retry control in accordance with balk abutment determination after execution of the load increasing control on the basis of the balk abutment determination.
Figure 11:
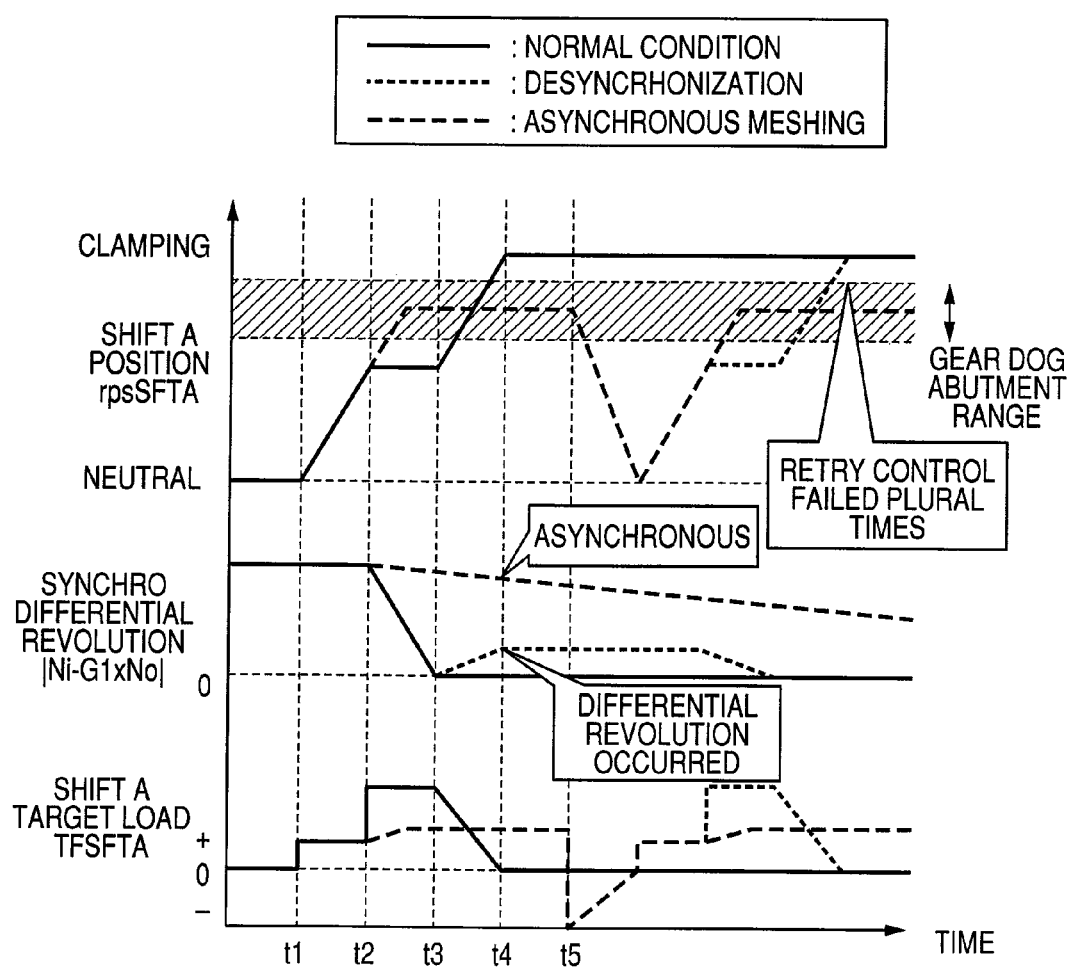
FIG. 11 is a time chart adopted in case of performing a retry control in accordance with gear dog determination.

Next, with reference to FIGS. 9 to 11, the following description is provided about in what manner a sleeve is clamped to a free rotatable gear by the automatic transmission control system according to the present invention.

As an example, a description will be given about the case where the shift A actuator 112 is controlled to control the first synchromesh mechanism 21 and both first synchromesh mechanism 21 and first driving gear 1 come into mesh with each other, providing a first shift range.

(Retry Control by Balk Abutment Determination)

FIG. 9 is a time chart used in case of performing a load increase control on the basis of balk abutment determination.

In FIG. 9, time is plotted along the axis of abscissa, while the shift A position rpSFTA as a stroke signal of the first synchromesh mechanism 21, differential revolution |Ni–G1× No| of the first synchromesh mechanism 21 and a shift A target load TFSFTA as a pushing load for the sleeve of the first synchromesh mechanism 21 are plotted in order from above along the axis of ordinate, in which G1 stands for a gear ratio of the first shift range.

First, a description will be given about a normal clamping control (solid lines in the figure). At time t1, a control for clamping the first synchromesh mechanism 21 to the first driving gear 1 is started. Thereafter, at time t2, the shift A position rpSFTA comes into abutment against the balk ring, whereupon the differential revolution |Ni–G1×No| decreases gradually by increasing the shift A target load TFSFTA for synchronizing the differential revolution |Ni–G1×No|. Upon synchronization of the differential revolution |Ni–G1×No| at time t3, the sleeve is disengaged from the balk ring and moves in the clamping direction, so that the shift A position rpSFTA increases gradually. After the disengagement of the sleeve from the balk ring, the shift A target load TFSFTA is decreased gradually by the limiter load described above in connection with FIG. 7 in order to cushion the collision shock of the sleeve against the gear dog, then at time t4 the shift position A rpSFTA becomes the clamping position, whereby the sleeve clamping control for the free rotatable gear is completed.

Next, a description will be given about the case (dotted lines in the figure) where the pushing load for the sleeve is increased to perform a clamping control when the differential revolution |Ni–G1×No| of the first synchromesh mechanism 21 does not synchronize due to a lack of synchronizing power. At time t1 to t3 there is performed the same control as the normal control, but during the period from t3 to t4 the sleeve is fixed to the balk ring because the differential revolution |Ni–G1×No| does not synchronize at t3. Therefore, at time t3, a control for increasing the pushing load for the sleeve is started on the basis of the balk abutment determination described above in connection with FIG. 5. With this control, when the differential revolution |Ni–G1×No| becomes synchronized at time t4, the sleeve is disengaged from the balk ring and moves in the clamping direction, so that the shift A position rpSFTA increases gradually. After the time t4 corresponding to the disengaged point of the sleeve from the balk ring there is performed the control for decreasing the shift A target load TFSFTA gradually by the limiter load described above in connection with FIG. 7 as is the case with the normal control, then at time t5 the shift A position rpSFTA assumes the clamping position, whereby the sleeve clamping control for the free rotatable gear is completed.

Further, a description will now be given about the case (broken lines) where the sleeve is not disengaged from the balk ring due to sticking of the balk ring to the gear dog. From time t1 to t4 there is performed the same control as that performed in case of increasing the pushing load, but during the period from time t4 to t5 the sleeve is fixed to the balk ring due to sticking of the balk ring to the gear dog. Thus, the pushing load increasing control is continued from time t4 to t5, but at time t5 a shift is made to the retry control, determining that the sleeve is in a fixed state despite the pushing load having been increased. As to the operation performed at this time, it will be described below with reference to FIG. 10.

FIG. 10 is a time chart used in case of performing the retry control in response to balk abutment determination after execution of the pushing load increasing control in response to the balk abutment determination.

In FIG. 10, time is plotted along the axis of abscissa, while the shift A position rpSFTA as a stroke signal of the first synchromesh mechanism 21, a balk abutment timer TMRBKNG, Retry Execution Flag fRTRYEXE and Retry Release Flag fSOFRTRY are plotted in this order from above along the axis of ordinate.

First, at time t1, there is started a control for clamping the first synchromesh mechanism 21 to the first driving gear 1. Thereafter, at time t2, when the shift A position rpSFTA reaches a position within the balk abutment range, the balk abutment timer TMRBKNG is incremented. Next, at time t3, when Balk Abutment Determination Flag is set despite the sleeve pushing load having been increased, Retry Execution Flag fRTRYEXE is set as described above in connection with FIG. 8. At this time, since Retry Execution Flag is set during the clamping operation, Retry Release Flag is set and a gear release control is performed for returning the sleeve in operation once to its neutral position during the period from time t3 to t5. As a result of the gear release control the shift A position rpSFTA deviates from the balk abutment range at time t4, so that the balk abutment timer TMRBKNG is cleared and so is Balk Abutment Determination Flag. Thereafter, when the shift A position rpSFTA assumes its neutral position at time t5, there is started a control for clamping the sleeve again to the free rotatable gear, then again from time t6 the balk abutment timer TMRBKNG is incremented. Next, when the shift position rpSFTA deviates from the balk abutment range at time t7, the balk abutment timer TMRBKNG is cleared. At this time, since the balk abutment timer TMRBKNG does not exceed the balk abutment determination time, Balk Abutment Determination Flag remains cleared. Thereafter, when the shift A position rpSFTA assumes its clamped position at time t8, the control of clamping the sleeve to the free rotatable gear is completed.

As described above, in the event of sticking of the balk ring to the gear dog due to breakage of an oil film present between the balk ring and the gear dog cone surface, the sleeve can be clamped to the free rotatable gear positively by once returning the sleeve to its neutral position and performing a re-clamping operation of the sleeve for the free rotatable gear. At this time, since the sleeve is once returned to its neutral position, it becomes possible to feed oil to between the balk ring and the gear dog cone. Usually, in the case of a manual transmission, oil is scraped up by rotation of a gear to effect lubrication. However, in case of controlling the amount of oil electronically with use of a motor or the like, the amount of lubricating oil may be increased at the time of sticking of the balk ring. In the event of sticking of the balk ring, the sleeve is in a fixed state near the balk ring despite the differential revolution being synchronized. Therefore, by adding the information on differential revolution to the result of the balk abutment determination it is possible to determine a lack of synchronizing power or sticking of the balk ring. For example, when the value of |Ni−G×No| is not larger than a predetermined value, it is determined that there exists a state of sticking of the balk ring (G stands for a gear ratio of the shift range to be attained).

When the balk ring is determined to be sticking as a result of determination of a lack of synchronizing power or sticking of the balk ring, the possibility of success in clamping is low even if the pushing load for the sleeve is increased. Therefore, for minimizing a worsening of drivability, a shift to the retry control is made promptly.

(Retry Control by Gear Dog Abutment Determination)

FIG. 11 is a time chart used when performing the retry control on the basis of gear dog abutment determination.

In FIG. 11, time is plotted along the axis of abscissa, while the shift A position rpSFTA as a stroke signal of the first synchromesh mechanism 21, the differential revolution |Ni−G1×No| of the first synchromesh mechanism 21 and the shift A target load TFSFTA as a pushing load for the sleeve of the first synchromesh mechanism 21 are plotted in this order from above along the axis of ordinate, in which G1 stands for a gear ratio of the first shift range.

As to the clamping control (solid lines in the figure) in normal condition, it is the same as that described above in connection with FIG. 9, so a description will be given first about the case (dotted lines in the figure) where the sleeve cannot be clamped to the gear dog due to desynchronization. The same control as in normal condition is performed from time t1 to t3, but after the differential revolution |Ni−G1×No| synchronizes at time t3, there exists the differential revolution |Ni−G1×No| due to the influence of disturbances such as clutch drag torque or a change in load of the output shaft rotation, so that the sleeve cannot be clamped to the free rotatable gear and is in a fixed state near the gear dog. Consequently, during the period from when the sleeve fixed near the gear dog up to t5, a gear dog abutment timer (not shown) is incremented on the basis of the gear dog abutment determination described above in connection with FIG. 6. When the time set in the gear dog abutment timer exceeds the gear dog abutment determination time at time t5, Gear Dog Abutment Determination Flag (not shown) is set and a shift is made to the retry control. The operation of the retry control is the same as that described above in connection with FIG. 10.

The following description is now provided about the case (broken line in the figure) where the sleeve cannot be clamped to the gear dog due to asynchronous meshing which is attributable to deterioration of the balk ring. From time t1 to t2 there is performed the same control as that performed in the case of desynchronization. However, since the balk ring is worn and deteriorated, the sleeve does not stay near the balk ring and reaches the vicinity of the gear dog during the period from time t2 to t3. At this time, the differential revolution |Ni−G1×No| goes on changing according to the development of the situation without synchronization. Therefore, as is the case with desynchronization, Gear Dog Abutment Determination Flag (not shown) is set at time t5 and a shift is made to the retry control. In this case, there is a great possibility of plural failures because the balk ring is deteriorated. But there sometimes is a case where the clamping can be effected upon synchronization of the differential revolution |Ni−G1×No| which is changing according to the development of the situation.

As described above, by performing the retry control when the sleeve is fixed near the gear dog, it becomes possible to clamp the sleeve in operation to the free rotatable gear. In the case of asynchronous meshing it is presumed that the differential revolution |Ni−G1×No| may be larger than that in the case of desynchronization, so by adding information on the differential revolution to the result of the gear dog abutment determination it is possible to make distinction between desynchronization and asynchronous meshing. Moreover, in the case of desynchronization, the sleeve once stays near the balk ring, but in the case of asynchronous meshing the sleeve does not stay near the balk ring and reaches near the gear dog, so it is also possible to make distinction between desynchronization and asynchronous meshing in accordance with a change (differential value) of the stroke position signal. As a result of distinction between desynchronization and asynchronous meshing, the balk ring is deteriorated in the case of asynchronous meshing and therefore it is preferable that the use of the free rotatable gear concerned be inhibited at once by specific gear shift range inhibiting means to be described later to prevent damage of the transmission.

In order to let remain the history of shift operations from the time of shipping up to the present there may be adopted a construction wherein the staying time near the balk ring is measured and is stored in the backup RAM (Random Access Memory) or EE-PROM (Electronically Erasable and Programmable Read Only Memory) mounted on the power train control unit 100. By such retention of the history of shift operations it is possible to determine a failed, or defective, portion in a selling store or a repair shop.

(Inhibition of Free Rotatable Gear)

Next, with reference to FIGS. 12 and 13, a description will be given about the case where the use of a predetermined free rotatable gear is inhibited after executing the retry control plural times by the automatic transmission control system of the present invention.

Figure 12:
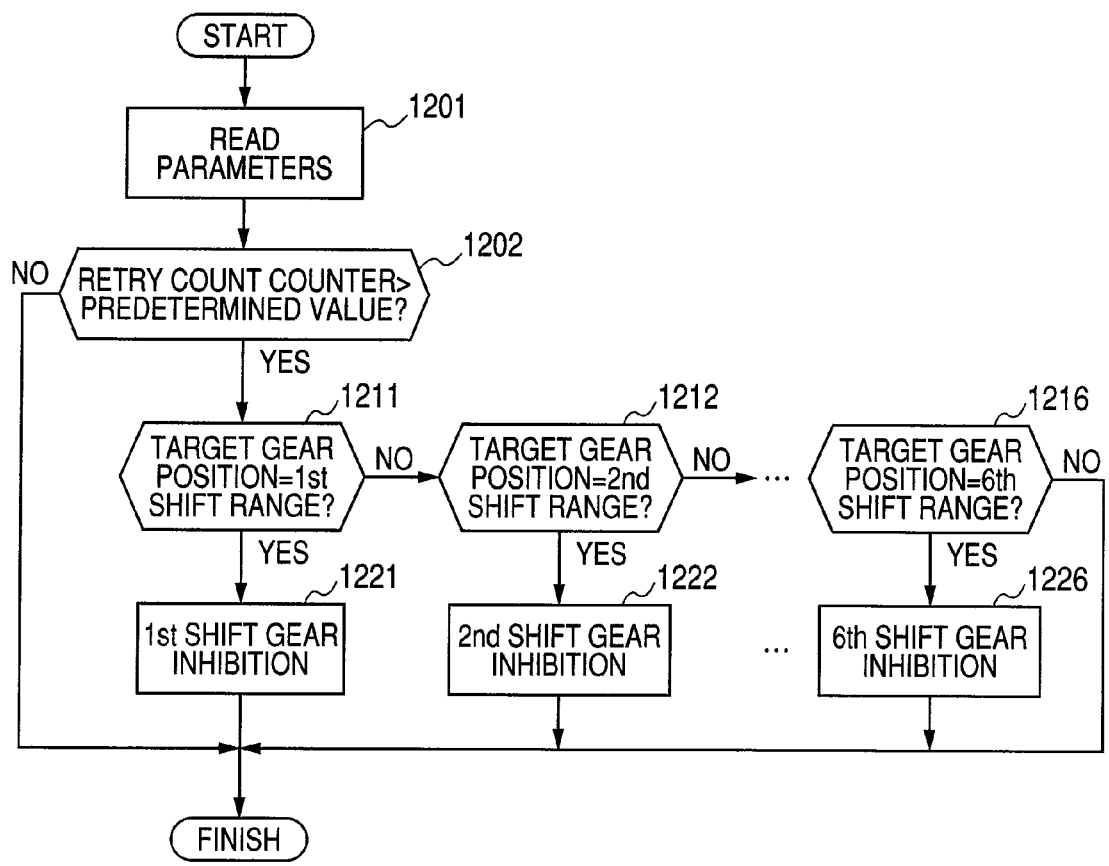
FIG. 12 is a flowchart showing control contents of specific gear shift range inhibiting means according to the embodiment.

FIG. 12 is a flow chart showing the contents of control performed by specific gear shift range inhibiting means.

First, parameters are read in step 1201, then in step 1202 it is determined whether the retry count calculated by the retry count calculating means which has been described above in connection with FIG. 8 is larger than a predetermined value or not. If it is determined that the retry count is larger than the predetermined value, the processing flow advances to step 1211, in which it is determined whether the target gear position is the first shift range or not. On the other hand, if it is determined in step 1202 that the retry count is smaller than the predetermined value, the processing is ended. If it is determined in step 1211 that the target gear position is the first shift range, the processing flow advances to step 1221, in which there is performed a processing for inhibiting the use of the first shift gear. If it is determined in step 1211 that the target gear position is not the first shift range, the processing flow advances to step 1212, in which it is determined whether the target gear position is the second shift range or not. If it is determined in step 1212 that the target gear position is the second shift range, the processing flow advances to step 1222, in which there is performed a processing for inhibiting the use of the second shift gear. Such determinations and processing are conducted up to the sixth shift range and then the processing in question is ended. The specific gear shift range inhibiting processing is effected by defining first to sixth shift range layout flags as follows and operating the layout flags:

Specific Gear Shift Range Inhibition Flag =1 (Inhibition)/0 (Permission) (1)

Specific Gear Shift Range Inhibition Flag [1]=1 (Inhibition)/0 (Permission) (2)

Specific Gear Shift Range Inhibition Flag [2]=1 (Inhibition)/0 (Permission) (3)

Specific Gear Shift Range Inhibition Flag [3]=1 (Inhibition)/0 (Permission) (4)

Specific Gear Shift Range Inhibition Flag [4]=1 (Inhibition)/0 (Permission) (5)

Specific Gear Shift Range Inhibition Flag [5]=1 (Inhibition)/0 (Permission) (6)

Figure 13:
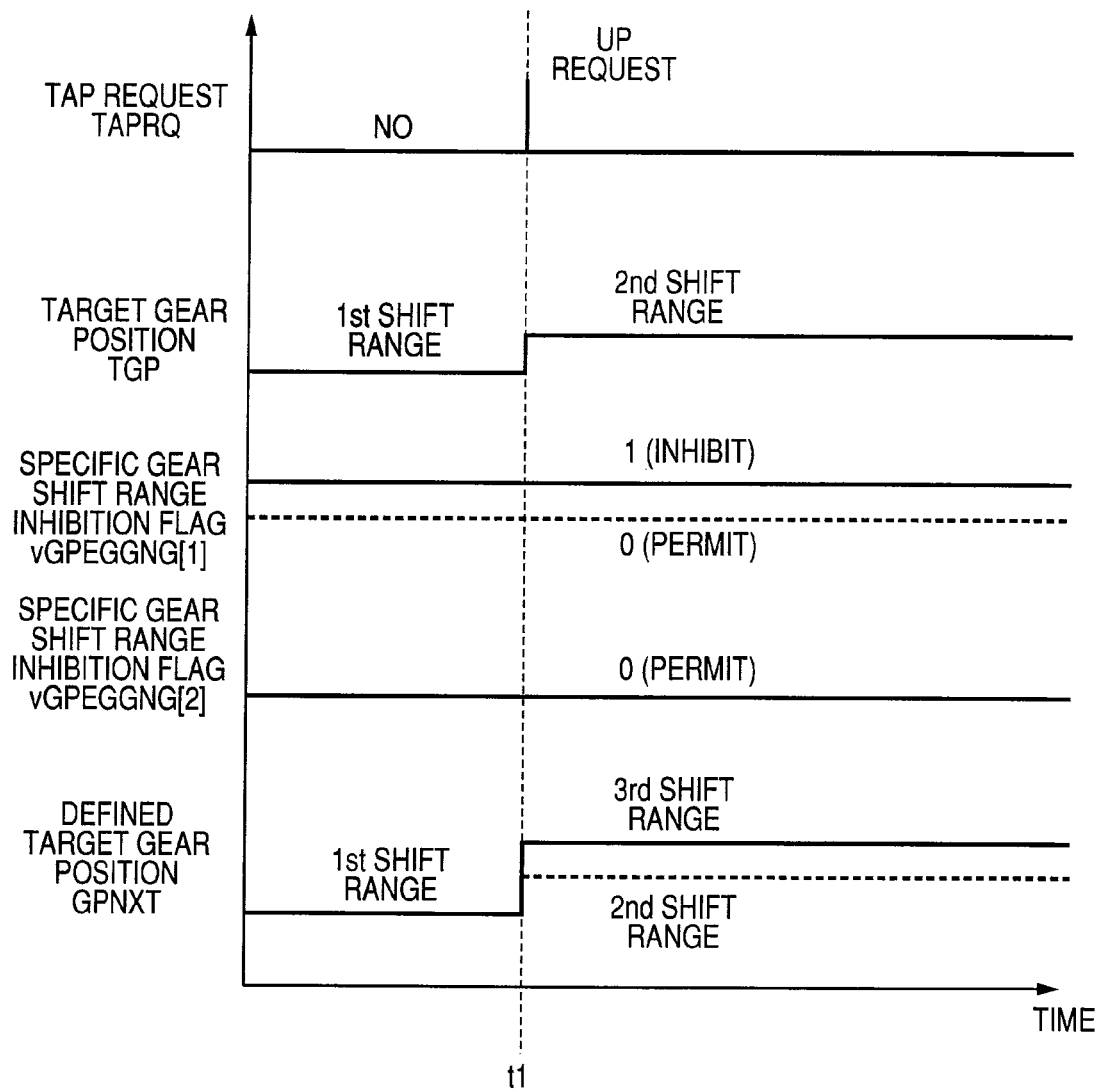
FIG. 13 is a time chart adopted in case of performing a shifting operation in accordance with a driver's switch operation in a state in which the use of a second shift idle gear is inhibited by the specific gear shift range inhibiting means according to the embodiment.

If it is determined that the layout number FIG. 13 is a time chart used when performing a shifting operation in accordance with a switch operation of the driver in a state in which the use of the free rotatable gear of the second shift range is inhibited by the specific gear shift range inhibiting means.

In FIG. 13, time is plotted along the axis of abscissa, while a tap request TAPRQ (Up request: 0→+1, Down request: 0→−1) as a switch operation signal, a target gear position TGP, Specific Gear Shift Range Inhibition Flag [1] (second shift range), Specific Gear Shift Range Inhibition Flag [2] (third shift range), and a defined target gear position GPNXT, are plotted in this order from above along the axis of ordinate. The driver's switch operation signal corresponds to a shift request made by a paddle switch attached to a steering wheel and a shift request made by a floor switch attached to a shift lever for shifting operations to P, R, N and D ranges.

First, a description will be given about the case (dotted line) where the use of a specific gear shift range is not inhibited. While the vehicle is running at the first shift range of the manual shift mode in which a shifting operation is performed in accordance with the driver's switch operation, if at time t1 the value of the tap request TAPRQ changes and it is determined that there exists an Up request, the target gear position TGP changes from the first to the second shift range. At this time, since the value of Specific Gear Shift Range Inhibition Flag [1] (second shift range) is 0 (permission), it is determined that the shift to the second shift range is permitted, and the target gear position TGP (second shift range) is substituted into the defined target gear position GPNXT. Thereafter, the second synchromesh mechanism 22 is selected in accordance with the value of the defined target gear position GPNXT and there is performed a control for clamping the sleeve to the second driving gear 2 which is a free rotatable gear of the second shift range.

Next, a description will be given about the case (solid line in the figure) where the use of a specific gear shift range is inhibited. While the vehicle is running at the first shift range, if at time t1 the value of the tap request TAPRQ changes and it is determined that there exists an Up request, the target gear position TGP changes from the first to the second shift range. At this time, since the value of Specific Gear Shift Range Inhibition Flag [1] (second shift range) is 1 (inhibition), the shift to the second shift range is inhibited. Therefore, a shift to the third shift range is performed, but in this case it is necessary to determine whether the shift to the third shift range is inhibited or not. Therefore, calculation of the defined target gear position GPNXT is performed after making reference to the value of Specific Gear Shift Range Inhibition Flag [2] (third shift range). In FIG. 13, since the value of Specific Gear Shift Range Inhibition Flag [2] (third shift range) is 0 (permission), the defined target gear position GPNXT is updated to the third shift range. Thereafter, the third synchromesh mechanism 23 is selected in accordance with the value of the defined target gear position GPNXT and there is performed a control for clamping the sleeve to the third driving gear 3 which is a free rotatable gear of the third shift range.

As set forth above, in order to minimize damage of the transmission in the event of limp home, it is preferable to immediately inhibit the use of the free rotatable gear concerned.

Thus, when the vehicle is running in the manual transmission mode of performing a shifting operation in response to the driver's switch operation in a state in which the use of a predetermined free rotatable gear is inhibited by the specific gear shift range inhibiting means, it becomes possible by a single switch operation to skip over the shift range of the free rotatable gear concerned and perform a shifting operation. Even when the driver requests shifting to the inhibited shift range, it is possible to minimize damage of the transmission.

(Additional way of control)

In the case where it is impossible to effect clamping to the target shift range and the gear position before shift is undefined (for example, the failure of D range being selected during inertia running in N (neutral) range), there may be performed a control for clamping to the clamping-permitted shift range in accordance with the vehicle speed. Further, there may be adopted a construction in which if the oil temperature of the transmission is low (e.g., 0° C. or lower) when the use of a specific gear shift range is inhibited, the inhibited state of using the specific gear shift range is cancelled after rise of the oil temperature (e.g., after warm-up to 40° C. or higher). In the state of a low temperature the clamping control is very likely to fail because of an increase of viscous resistance and for this reason there is a case where the use of a synchromesh mechanism is inhibited despite it being in normal condition. Thus, by cancelling the inhibited state after a rise of oil temperature it is possible to prevent a worsening of drivability.

The present invention is applicable to all of systems which performs switching of the shift range with use of a synchromesh mechanism, such as, for example, an automated MT system having a friction type clutch in one of shift ranges, and a generally well-known twin clutch automated MT (DCT: Dual Clutch Transmission).

According to the embodiment, when clamping a sleeve to a free rotatable gear, if the sleeve is fixed near a balk ring during the period after instructing movement of the sleeve to a clamping position and before movement of the sleeve to a predetermined positional range which makes it possible to judge a clamped state of the sleeve, the pushing load for the sleeve is increased, while if the sleeve is fixed near the free rotatable gear, there is performed a control of once returning the sleeve to its neutral position and re-clamping it to the free rotatable gear. Thus, it is possible to prevent a worsening of drivability in the event of failure of a shifting operation.

If the sleeve does not clamp to the free rotatable gear after increasing the pushing load for the sleeve, there is performed a control of once returning the sleeve to its neutral position and re-clamping it to the free rotatable gear, whereby the sleeve can be clamped positively.

Further, since the number of times the sleeve was re-clamped to the free rotatable gear is counted and a control for inhibiting the use of the free rotatable gear concerned is performed in accordance with the counted number of times, it is possible to minimize damage of the transmission.

What is claimed is:

1. A control system for an automatic transmission having:
   an input shaft adapted to receive torque from a driving force source and rotate thereby;
   an output shaft for output of torque to a driving shaft of a vehicle;
   a plurality of gears adapted to rotate in synchronism with the input shaft and/or the output shaft;
   a plurality of free rotatable gears meshing with said gears;
   a plurality of sleeves adapted to rotate in synchronism with the input shaft and/or the output shaft and slidable axially; and
   a balk ring disposed between the free rotatable gears and the sleeves,
   wherein the balk ring is pushed against any of the free rotatable gears by movement of any of the sleeves, thereby synchronizing rotation of the sleeve with that of the free rotatable gear, and the sleeve and the free rotatable gear are brought into mesh with each other by further movement of the sleeve to attain a predetermined shift range, the control system comprising:
   balk abutment determining means for determining whether the sleeve stays within a balk abutment range for a predetermined time or not; and
   pushing load increasing means for increasing a pushing load for the sleeve when it is determined by the balk abutment determining means that the sleeve stays within the balk abutment range for the predetermined time.

2. A control system for an automatic transmission according to claim 1, further comprising:
   gear dog abutment determination means for determining whether the sleeve concerned stays within a gear dog abutment range or not; and
   retry control means which, when it is determined by the gear dog abutment determination means that the sleeve stays within the gear dog abutment range, returns the sleeve once to a neutral position thereof and causes the sleeve to be re-clamped to the free rotatable gear concerned.

3. A control system for an automatic transmission having:
   an input shaft adapted to receive torque from a driving force source and rotate thereby;
   an output shaft for output of torque to a driving shaft of a vehicle;
   a plurality of gears adapted to rotate in synchronism with the input shaft and/or the output shaft;
   a plurality of free rotatable gears meshing with said gears;
   a plurality of sleeves adapted to rotate in synchronism with the input shaft and/or the output shaft and slidable axially; and
   a balk ring disposed between the free rotatable gears and the sleeves,
   wherein the balk ring is pushed against any of the free rotatable gears by movement of any of the sleeves, thereby synchronizing rotation of the sleeve with that of the free rotatable gear, and the sleeve and the free rotatable gear are brought into mesh with each other by further movement of the sleeve to attain a predetermined shift range, the control system comprising:
   gear dog abutment determination means for determining whether the sleeve concerned stays within a gear dog abutment range or not; and
   retry control means which, when it is determined by the gear dog abutment determination means that the sleeve stays within the gear dog abutment range, returns the sleeve once to a neutral position thereof and causes the sleeve to be re-clamped to the free rotatable gear concerned.

4. A control system for an automatic transmission according to claim 1, a retry control means is provided in the control system, wherein when the sleeve concerned is not clamped to the free rotatable gear concerned after the pushing load for the sleeve is increased by the pushing load increasing means, the sleeve is re-clamped to the free rotatable gear by the retry control means which returns the sleeve once to a neutral position thereof and re-clamp the sleeve to the free rotatable gear.

5. A control system for an automatic transmission according to claim 2, further comprising:

retry count calculating means for counting the number of times the sleeve was re-clamped to the free rotatable gear by the retry control means; and specific gear shift range inhibiting means for inhibiting the use of the free rotatable gear in accordance with the number of times counted by the retry count calculating means.

6. A control system for an automatic transmission according to claim 3, further comprising:

retry count calculating means for counting the number of times the sleeve was re-clamped to the free rotatable gear by the retry control means; and specific gear shift range inhibiting means for inhibiting the use of the free rotatable gear in accordance with the number of times counted by the retry count calculating means.

7. A control system for an automatic transmission according to claim 5, an oil temperature sensing means is provided in the transmission, wherein the specific gear shift range inhibiting means inhibits or releases a specific gear shift range in accordance with the output of the oil temperature sensing means.

8. A control system for an automatic transmission according to claim 5, a switching means is provided in the control system, wherein when the vehicle is running in a manual shift mode of performing a shifting operation in accordance with a switch operation of a driver by the switching means in a state in which the use of a predetermined free rotatable gear is inhibited by the specific gear shift range inhibiting means, the shifting operation is performed while skipping over the free rotatable gear by a single switch operation of a driver.

9. A control method for an automatic transmission having:

an input shaft adapted to receive torque from a driving force source and rotate thereby;

an output shaft for output of torque to a driving shaft of a vehicle;

a plurality of free rotatable gears for the transfer of rotation between the input shaft and the output shaft;

a plurality of gears meshing with the free rotatable gears and adapted to rotate in synchronism with the input shaft and/or the output shaft;

a plurality of sleeves adapted to rotate in synchronism with the input shaft and/or the output shaft and slidable axially; and a balk ring disposed between the free rotatable gears and the sleeves, wherein the balk ring is pushed against any of the free rotatable gears by movement of any of the sleeves, thereby synchronizing rotation of the sleeve with that of the free rotatable gear to bring the sleeve and the free rotatable gear into mesh with each other and attain a predetermined shift range, wherein when the sleeve and the free rotatable gear are to be clamped with each other, during the period after instructing movement of the sleeve to a clamping position until movement of the sleeve to a predetermined positional range which makes it possible to judge that the sleeve has been clamped to the free rotatable gear, and in the case where the sleeve stays within a balk abutment range for a predetermined time, a pushing load for the sleeve is increased.

10. A control method for an automatic transmission according to claim 9, wherein when the sleeve concerned stays within the balk abutment range for the predetermined time, the sleeve is once returned to a neutral position thereof and is re-clamped to the free rotatable gear concerned.

11. A control method for an automatic transmission according to claim 9, wherein when the sleeve concerned is not clamped to the free rotatable gear concerned after increasing the pushing load for the sleeve, the sleeve is once returned to a neutral position thereof and is re-clamped to the free rotatable gear.

12. A control method for an automatic transmission according to claim 9, wherein when the sleeve concerned stays within the gear dog abutment range for the predetermined time, the sleeve is once returned to a neutral position thereof and is re-clamped to the free rotatable gear concerned.

13. A control method for an automatic transmission according to claim 10, wherein when it is determined that the sleeve stays within the balk abutment range for the predetermined time and when the value of $|Ni-G \times No|$ (Ni: the number of revolutions of the input shaft, No: the number of revolutions of the output shaft, G: gear ratio) is not larger than a predetermined value, the sleeve is once returned to the neutral position and is re-clamped to the free rotatable gear.

14. A control method for an automatic transmission having:

an input shaft adapted to receive torque from a driving force source and rotate thereby;

an output shaft for output of torque to a driving shaft of a vehicle;

a plurality of free rotatable gears for the transfer of torque between the input shaft and the output shaft;

a plurality of gears meshing with the free rotatable gears and adapted to rotate in synchronism with the input shaft and/or the output shaft;

a plurality of sleeves adapted to rotate in synchronism with the input shaft and/or the output shaft and slidable axially; and a balk ring disposed between the free rotatable gears and the sleeves, wherein the balk ring is pushed against any of the free rotatable gears by movement of any of the sleeves, thereby synchronizing rotation of the sleeve with that of the free rotatable gear to bring the sleeve and the free rotatable gear into mesh with each other and attain a predetermined shift range, wherein when the sleeve stays within a gear dog abutment range for a predetermined time and when the value of $|Ni-G \times No|$ (Ni: the number of revolutions of the input shaft, No: the number of revolutions of the output shaft, G: gear ratio) is not smaller than a predetermined value, the clamping of the sleeve to the free rotatable gear is inhibited.

15. A control system for an automatic transmission having an input shaft adapted to receive torque from a driving force source and rotate thereby, an output shaft for output of torque to a driving shaft of a vehicle, a plurality of free rotatable gears for the transfer of rotation between the input shaft and the output shaft, a plurality of sleeves adapted to rotate integrally with the input shaft or the output shaft and slidable axially, and a balk ring disposed between the free rotatable gears and the sleeves, wherein the balk ring is pushed against any of the free rotatable gears by movement of any of the sleeves to effect a frictional transfer of torque, thereby synchronizing the rotation of the sleeve and that of the free rotatable gear with each other and bringing the sleeve and the free rotatable gear into mesh with each other to attain a predetermined shift range, the control system comprising, in connection with the time when the sleeve is to be clamped to the free rotatable gear and during the period after instructing movement of the sleeve to a clamping position until movement of the sleeve to a predetermined positional range which makes it possible to judge that the sleeve has been clamped to the free rotatable gear, balk abutment determination means for determining that the sleeve is in a fixed state near the balk ring;

pushing load increasing means for increasing a pushing load for the sleeve when it is determined by the balk abutment determination means that the sleeve is in a fixed state near the balk ring; and retry control means for returning the sleeve once to a neutral position thereof and re-clamping the sleeve to the free rotatable gear when it is determined by the gear dog abutment determination means that the sleeve is in a fixed state near the free rotatable gear.

16. A control system for an automatic transmission according to claim 15, a retry control means is provided in the control system, wherein when the sleeve is not clamped to the free rotatable gear after increasing the pushing load for the sleeve by the pushing load increasing means, the sleeve is re-clamped to the free rotatable gear by the retry control means.

17. A control system for an automatic transmission according to claim 15, further comprising:

retry count calculating means for counting the number of times the sleeve was clamped to the free rotatable gear by the retry control means; and specific gear shift range inhibiting means for inhibiting the use of the free rotatable gear in accordance with the number of times counted by the retry count calculating means.

18. A control system for an automatic transmission according to claim 17, an oil temperature sensing means is provided in the transmission, wherein the specific gear shift range inhibiting means inhibits or releases a specific gear shift range in accordance with the output of the oil temperature sensing means.

19. A control system for an automatic transmission according to claim 17, a switching means is provided in the control system, wherein when the vehicle is running in a manual shift mode of performing a shifting operation in accordance with a switch operation of a driver by the switching means in a state in which the use of a predetermined free rotatable gear is inhibited by the specific gear shift range inhibiting means, the shifting operation is performed while skipping over the free rotatable gear by a single switch operation of a driver.

20. A control method for an automatic transmission having an input shaft adapted to receive torque from a driving force source and rotate thereby, an output shaft for output of torque to a driving shaft of a vehicle, a plurality of free rotatable gears for the transfer of rotation between the input shaft and the output shaft, a plurality of sleeves adapted to rotate integrally with the input shaft or the output shaft and slidable axially, and a balk ring disposed between the free rotatable gears and the sleeve, wherein the balk ring is pushed against any of the free rotatable gears by movement of any of the sleeves to effect a frictional transfer of torque, thereby synchronizing the rotation of the sleeve and that of the free rotatable gear with each other and bringing the sleeve and the free rotatable gear into mesh with one another to attain a predetermined shift range, wherein when the sleeve is to be clamped to the free rotatable gear and during the period after instructing movement of the sleeve to a clamping position until movement of the sleeve to a predetermined positional range which makes it possible to judge that the sleeve has been clamped to the free rotatable gear, a pushing load for the sleeve is increased when the sleeve is in a fixed state near the balk ring, while when the sleeve is in a fixed state near the free rotatable gear, the sleeve is once returned to a neutral position thereof and is re-clamped to the free rotatable gear.

21. A control method for an automatic transmission according to claim 20, wherein when the sleeve is not clamped to the free rotatable gear after increasing the pushing load for the sleeve, the sleeve is once returned to the neutral position and is re-clamped to the free rotatable gear.

* * * * *